US011206221B1

(12) United States Patent
Guo et al.

(10) Patent No.: US 11,206,221 B1
(45) Date of Patent: Dec. 21, 2021

(54) ONLINE TASK DISPATCHING AND SCHEDULING SYSTEM AND METHOD THEREOF

(71) Applicant: Deke Guo, Hunan (CN)

(72) Inventors: Deke Guo, Hunan (CN); Lailong Luo, Hunan (CN); Guoming Tang, Hunan (CN); Xinyi Li, Hunan (CN); Hao Yuan, Hunan (CN); Xueshan Luo, Hunan (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 17/339,855

(22) Filed: Jun. 4, 2021

(51) Int. Cl.
*H04L 12/863* (2013.01)
*H04L 12/875* (2013.01)
*H04L 12/873* (2013.01)

(52) U.S. Cl.
CPC ........ *H04L 47/6225* (2013.01); *H04L 47/527* (2013.01); *H04L 47/568* (2013.01)

(58) Field of Classification Search
CPC ... H04L 28/14; H04L 47/125; H04L 49/3018; H04L 49/3027; H04L 49/90; H04L 67/1004; H04L 67/1008; H04L 67/101; H04L 67/1012; H04L 67/1021; H04L 67/1036; H04L 67/2842; H04W 28/08; H04W 29/08144; H04W 29/08153
See application file for complete search history.

(56) References Cited

U.S. PATENT DOCUMENTS

| | | | | |
|---|---|---|---|---|
| 2016/0294813 | A1* | 10/2016 | Zou | H04L 63/0815 |
| 2018/0183855 | A1* | 6/2018 | Sabella | G06F 9/505 |
| 2020/0396744 | A1* | 12/2020 | Xiong | H04W 56/001 |
| 2021/0136142 | A1* | 5/2021 | Dong | H04L 67/101 |
| 2021/0192555 | A1* | 6/2021 | Tang | G06N 3/0445 |

* cited by examiner

*Primary Examiner* — Kan Yuen
(74) *Attorney, Agent, or Firm* — Dragon Sun Law Firm, PC; Jinggao Li, Esq.

(57) ABSTRACT

The present disclosure relates to an online task dispatching and scheduling system. The system includes an end device; an access point (AP) configured to receive a task from the end device; one or more edge servers configured to receive the task from the AP, the one or more edge servers including a task waiting queue, a processing pool, a task completion queue, and a scheduler, wherein the AP further includes a dispatcher utilizing Online Learning (OL) for determining a real-time state of network conditions and server loads; and the AP selects a target edge server from the one or more edge servers to which the task is to be dispatched; and wherein the scheduler utilizes Deep Reinforcement Learning (DRL) in generating a task scheduling policy for the one or more edge servers.

20 Claims, 25 Drawing Sheets

ONLINE TASK DISPATCHING AND SCHEDULING SYSTEM AND METHOD THEREOF

TECHNICAL FIELD

The present disclosure relates to the field of edge computing. In particular, the present disclosure relates to an online task dispatching and scheduling system and method thereof, wherein the method relates to a learning-based approach to online dispatching and fair scheduling of edge computing tasks.

BACKGROUND

The development of Internet of Things (IoTs) is boosting the applications/services at mobile ends. Constrained by their limited (computing, storage and bandwidth) capabilities, end devices can spend a large amount of time executing required tasks, potentially leading to diminished quality of service (QoS). Offloading computation-intensive tasks to the cloud (i.e., data centers) used to be a popular way to accommodate for the limited capabilities of the end devices. Nevertheless, the long distance between the cloud and the users may also result in a large communication delay, which can be unacceptable for time-sensitive applications/services.

Therefore, a heretofore unaddressed need exists in the art to address the aforementioned deficiencies and inadequacies.

SUMMARY

In view of the shortcomings of the existing technologies and the actual requirements, the present disclosure provides the online task dispatching and fair scheduling problem of offloaded tasks from end devices in the edge computing network. Specifically, the present disclosure provides the solution to two challenges:

i) to estimate the dynamic edge network conditions and server loads in real-time, and dispatch each task to an optimal edge server without causing network congestion and server overload; and ii) to schedule the dispatched tasks and allocate resources at each edge server, so as to minimize the average task response time and maintain the scheduling efficiency and fairness (e.g., avoiding severe task starvation).

The present disclosure relates to an online task dispatching and scheduling method (OTDS) which combines online learning (OL) and deep reinforcement learning (DRL) theories. The efficiency and fairness in task dispatching and scheduling under dynamic network conditions and server loads at the network edge can be achieved. Specifically, an OL-based dispatcher and a DRL-based scheduler is provided. For the dispatcher, OTDS applies the multi-armed bandit (MAB) method and uses tasks' delay as the reward to update the current state of edge network conditions and server loads in real-time. This can effectively improve dispatching efficiency by choosing the edge server with a maximum reward and avoid network congestion and server overload. For the scheduler, OTDS combines the RR method and deep Q-network techniques (DQN) to utilize a neural network that learns through past experience. The OTDS then generates the optimal scheduling policy by maximizing the reward evaluated by the reward function, which takes task processing time as well as task waiting time into consideration. Therefore, each edge server can dynamically allocate resources to each task according to its time-sensitive requirement. Thus, OTDS can minimize average task response time and maintain efficiency and fairness among all tasks.

The above challenges are addressed below and the following contributions are made:

the optimal task dispatching and scheduling problem of offloaded tasks in the edge computing scenario is modeled as a nonlinear optimization problem. By looking into the dynamic feature of edge network conditions and limited edge server resources, existing solutions to the above problems are typically shown to suffer from severe efficiency and fairness issues;

OTDS, an online task dispatching and fair scheduling method, is provided. Specifically, the dispatching method can dynamically assign tasks to optimal edge servers by estimating online network conditions and server loads in real-time. The scheduling method at each edge server utilizes an improved RR mechanism in combination with DRL, and thus can dynamically allocate resources to each task according to the time-sensitivity of the task to maintain efficiency and fairness in task scheduling; and extensive evaluations are conducted on the real-world dataset. The results show that OTDS can maintain a lower average response time and deadline missing rate compared to other baselines. In addition, OTDS can dynamically balance the allocation of resources between large tasks and small tasks to avoid severe task starvation.

The present disclosure relates to an online task dispatching and scheduling system. In one embodiment, the system includes an end device; an access point (AP) configured to receive a task from the end device; one or more edge servers configured to receive the task from the AP, the one or more edge servers including a task waiting queue, a processing pool, a task completion queue, and a scheduler, wherein the AP further includes a dispatcher utilizing Online Learning (OL) for determining a real-time state of network conditions and server loads; and the AP selects a target edge server from the one or more edge servers to which the task is to be dispatched; and wherein the scheduler can utilize Deep Reinforcement Learning (DRL) in generating a task scheduling policy for the one or more edge servers.

In one embodiment, the dispatcher further includes a Multi-Armed Bandit (MAB) framework, wherein the MAB framework includes one or more arms corresponding to the one or more edge servers, a calculating reward device configured to calculate a reward, and a calculating regret device for calculating regret. In one embodiment, the calculating reward device calculates the reward based on external delay and internal delay, and the MAB framework is configured to select a target arm from the one or more arms to maximize the reward.

In one embodiment, each of the one or more arms is associated with a weight, and the weight is updated after the task is completed. In one embodiment, the MAB framework further includes an Oracle for selecting an optimal arm based on known network conditions and server loads, and the regret is calculated based on a difference between a reward of the target arm and a reward of the optimal arm.

In one embodiment, the target arm is selected using an Upper Confidence Bound (UCB) method. In one embodiment, the scheduler further includes a weighted, multi-queue Round Robin (RR) method and a deep Q-network (DQN) in generating the task scheduling policy. In one embodiment, the weighted, multi-queue RR method further includes a task waiting queue, a processing pool, and a task completion queue, wherein the task completion queue is associated with the task. In one embodiment, the task initially enters the task waiting queue upon arrival at the target edge server, and the task is transferred from the task waiting queue to the processing pool based on the task scheduling policy.

In one embodiment, the task includes completed portions and incomplete portions; the completed portions are transferred to the task completion queue; and incomplete portions of the task are transferred to the task waiting queue. In one embodiment, the task further includes (1) a processing time corresponding to an amount of time the task is in the processing pool and (2) a waiting time corresponding to an amount of time the task is in the task waiting queue. In one embodiment, the target edge server further includes a state, the state based on the processing time and the waiting time. In one embodiment, the scheduler is configured to assign the task a quantum based on the state. In one embodiment, the scheduler is configured to create an action determining movement of the task from the task waiting queue to the processing pool.

In one embodiment, the scheduler is configured to calculate a reward function, the reward function based on the result of the action. In one embodiment, the scheduler creates the action based on the reward function. In one embodiment, the scheduler further includes a replay buffer, a target neural network, a main neural network, and a loss function. In one embodiment, the replay buffer is configured to store experiences of the scheduler interacting with the target edge node. In one embodiment, the target neural network generates a target Q-value and the main neural network generates a current Q-value. In one embodiment, the loss function is determined based on the difference between an expected value and a real value, and future actions created by the scheduler are based on the loss function.

By jointly tuning the task dispatching and scheduling in an online, dynamic way, the present disclosure significantly improves the QoS of requested tasks from the end users.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

FIGS. 6A-6B illustrate graphs showing performance results of an OTDS, wherein FIG. 6A shows task processing time in different task groups and FIG. 6B shows arrival times of different tasks, in accordance with an embodiment of the present disclosure;

FIGS. 7A-7F illustrate graphs showing performance results of various dispatching and scheduling methods, wherein FIG. 7A shows average response time for dispatching, FIG. 7B shows deadline missing rates for dispatching, FIG. 7C shows average response time for scheduling, FIG. 7D shows deadline missing rates for scheduling, FIG. 7E shows average response time for dispatching and scheduling, and FIG. 7F shows deadline missing rates for dispatching and scheduling, in accordance with an embodiment of the present disclosure;

FIGS. 8A-8F illustrate graphs showing the effects of task arrival density on average response time and deadline missing rate of various dispatching and scheduling methods, wherein FIG. 8A shows average response time for dispatching, FIG. 8B shows deadline missing rates for dispatching, FIG. 8C shows average response time for scheduling, FIG. 8D shows deadline missing rates for scheduling, FIG. 8E shows average response time for dispatching and scheduling, and FIG. 8F shows deadline missing rates for dispatching and scheduling, in accordance with an embodiment of the present disclosure;

FIGS. 9A-9B illustrate graphs showing the impact of different numbers of edge servers on deadline missing rate, wherein FIG. 9A shows deadline missing rate for dispatching and FIG. 9B shows deadline missing rate for dispatching and scheduling, in accordance with an embodiment of the present disclosure;

FIGS. 10A-10B illustrate graphs showing the impact of larger tasks on performance for various scheduling methods, wherein FIG. 10A shows the average response time of larger tasks in relation to the proportion of larger tasks and FIG. 10B shows the deadline missing rate in relation to the proportion of larger tasks, in accordance with an embodiment of the present disclosure; and FIGS. 11A-11B illustrate graphs showing the learning process of a DRL-based scheduler, wherein FIG. 11A shows the average response time in relation to the number of episodes and FIG. 11B shows the deadline missing rate in relation to the number of episodes, in accordance with an embodiment of the present disclosure;

DETAILED DESCRIPTION

Figure 1:
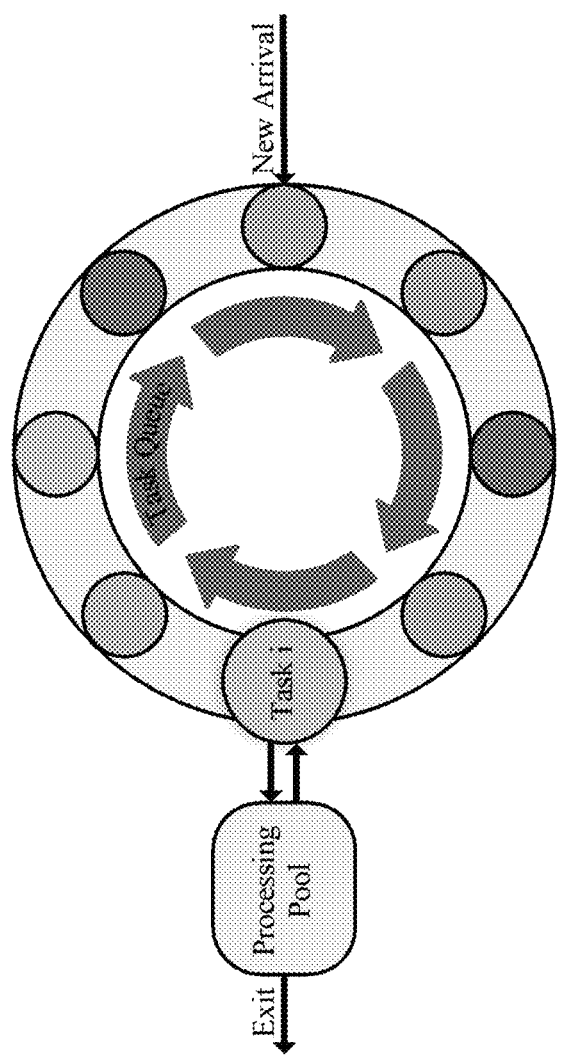
FIG. 1 illustrates a prior-art schematic diagram of a Round-Robin scheduling method.

The present disclosure will now be described more fully hereinafter with reference to the accompanying drawings, in which exemplary embodiments of the present disclosure are shown. The present disclosure may, however, be embodied in many different forms and cannot be construed as limited to the embodiments set forth herein. Rather, these embodiments are provided so that this disclosure is thorough and complete, and will fully convey the scope of the present disclosure to those skilled in the art. Like reference numerals refer to like elements throughout.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

The present disclosure relates to the field of edge computing, and more particularly relates to edge federation, resource integration, and an optimal service provisioning solution.

The emerging edge computing diagram comes into being and aids in solving the above-mentioned problems by placing small-scale servers closer to the users at the network edge. By offloading the tasks from the end devices to the edge servers, the users can receive edge services with better QoS (e.g., lower latency and higher precision) than in the cloud computing mode while saving stringent resources at the end devices.

Unlike the cloud data center, an edge server is usually equipped with finite resources and thus unable to serve all offloaded tasks from end users at once, especially with a large number of offloaded tasks. To this end, two fundamental problems need to be solved for the edge computing system: (Q1) which edge server can be assigned to accommodate each offloaded task, i.e., the task dispatching problem, and (Q2) in what order can each edge server process its dispatched tasks, i.e., the task scheduling problem. An ideal design of the task dispatching and scheduling methods can minimize the average task response time (delay) of those offloaded tasks such that the QoS in edge computing can be further improved. Although well investigated in the cloud computing era, task dispatching and scheduling are still faced with non-trivial challenges in the emerging edge computing scenario.

For task dispatching in edge computing, the load of edge servers tends to be dynamically changing and is associated with parameters unknown in advance, such as, without limitation, the available bandwidth of network links. However, previous solutions did not consider the dynamic nature of network conditions and server loads. For example, the nearest dispatching method simply forwards users' requests to their closest edge servers, which can lead to serious network congestion and server overload. Further, some literatures assume that the network conditions and server loads are known in advance, which is unrealistic in real-world scenarios. An online dispatching approach with real-time state estimations can potentially solve the problem at the network edge.

For task scheduling in edge computing, each edge server needs to adopt an efficient method to schedule a large number of accommodated tasks to minimize the average task response time. However, conventional solutions can lead to severe task starvation problems (i.e., tasks miss their deadlines due to long waiting times).

For example, i) the well-applied first-come-first-serve (FCFS) scheduling method can lead to small task (mice) starvation when large tasks (elephants) arrive earlier; and ii) the popular shortest-job-first (SJF) scheduling method can cause large task starvation as the small tasks have higher priority during the scheduling process.

Such scheduling methods may cause task starvation, resulting in the missing of deadlines for the starved tasks. The Round-Robin (RR) scheduling method was applied to ensure fairness (at resource allocation) among tasks and can be used to alleviate the task starvation problem. However, traditional RR methods simply allocate the same number of resources (or processing time, i.e., quantum) to each task at each round, leading to inefficient scheduling due to heterogeneous tasks. Consequently, large tasks can run for multiple rounds before completion, still causing their deadlines to be missed.

OnDisc is a first online task dispatching and scheduling method in edge-cloud, which dispatches each task to the edge server which can bring the least to the total weighted response time.

Fairness Scheduling in Cloud Computing

Fairness scheduling has been widely studied in cluster and cloud computing.

The rise of edge computing provides users with low latency and high bandwidth services. Compared with a cloud computing center, the resources on the edge servers are limited, and thus the resources can be reasonably and fairly scheduled and allocated. There are few studies on how to solve the unfair scheduling problem in edge computing. Therefore, in order to solve the larger load brought by more and more user devices, the present disclosure provides a solution on the fair scheduling problem in edge computing Round-Robin Scheduling Theory The RR scheduling method one of many fair scheduling methods. As illustrated in FIG. 1, the traditional RR scheduling theory maintains a task queue and processes queued tasks in order by allocating the same computing resources to each task. However, the RR scheduling method may be inefficient when scheduling a large number of (large and small) tasks, as resources cannot dynamically allocate to tasks according to its time-sensitive requirements.

However, the randomness of task arrival and the dynamic change of network conditions result in poor performance of these methods. Therefore, an online scheduling method is needed. In the present disclosure, an improved RR scheduling method is described in combination with deep reinforcement learning techniques. Such a combination can dynamically adapt to the different time-sensitive requirements of tasks and consider efficiency and fairness simultaneously.

System Model and Problem Formulation

For clarity, the major notations used in the present disclosure are explained in the following Table I below.

TABLE I

| Notation | Description |
| --- | --- |
| K, J | number of APs and edge servers, respectively |
| $\varepsilon$ | the set of total edge servers $E_j$ |
| $S_j$ | storage resources of the edge server $E_j$ |
| $C_j$ | computing resources of the edge server $E_j$ |
| $F_i$ | transfer matrix between APs and edge servers |
| $q_i$ | quantum assigned by the scheduler j to task $T_i$ |
| $\mathcal{T}$ | the set of tasks |
| $[T_i]$ | the data size of task $\mathcal{T}_i$ |
| $D^e_i$ | external delay of task $T_i$ |
| $D^{eX}_i$ | the X-th stage of external delay of task $T_i$ |
| $D^f_i$ | internal delay of task $T_i$ |
| $D^{fw}_i$ | waiting time in the waiting queue of task $T_i$ |
| $D^{fp}_i$ | processing time in the processing pool of task $T_i$ |
| $u_j(t), v_j(t)$ | reward of arm j |
| $g_j(t)$ | compound reward of arm j |
| j(t) | selected arm at time t |
| $R_\pi(t)$ | regret of policy $\pi$ compared with Oracle |
| s(t) | environment state of tasks in the edge server at time t |
| a(t) | action taken by the agent at time t |
| $\psi$ | mapping policy from environment states to actions |
| R(s(t), s(t)) | reward function of the DQN |
| Q, $\hat{Q}$ | Q-values of the main net and target net, respectively |
| $\theta, \hat{\theta}$ | parameters of the main net and target net, respectively |

Figure 2:
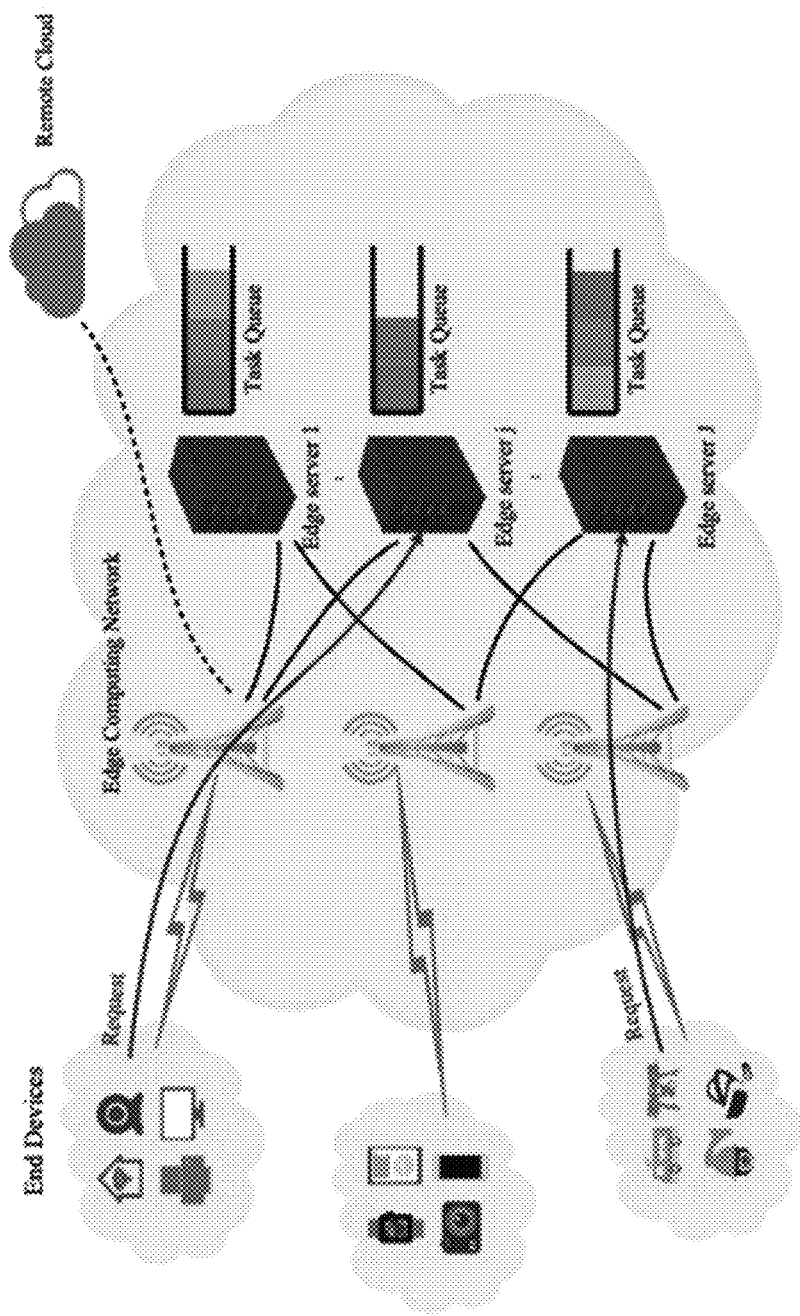
FIG. 2 illustrates an exemplary schematic diagram of an edge-computing environment, in accordance with an embodiment of the present disclosure.

As illustrated in FIG. 2, there may be J edge servers in the target edge network, denoted by E={$E_1, E_2, \ldots, E_J$}. For each edge server, there may be multiple configured applications/services. Additionally, K access points (APs) are assumed in one scenario, potentially placed at the base stations (BSs) of cellular networks or are BSs themselves, and each BS serves the users within a radius of some distance (e.g., one kilometer for a macro BS). Users offload tasks wirelessly from their end devices to the APs, and then the AP delivers the offloaded tasks to the edge servers in the target edge network. After a task arrives at the edge server, the task will wait in a task queue for processing. Notice that the edge network can link to a remote cloud with more sufficient computing resources. In the present disclosure, task dispatching and scheduling among all edge servers is a primary focus.

Edge servers are placed at the network edge so that offloaded tasks can be responded to with lower latency. Edge servers store and manage data and compute and analyze the tasks offloaded by the users. Particularly, for an arbitrary edge server $E_j$, its storage and computing resources (the data size processed per second) may be denoted by $S_j$ and $C_j$, respectively. Constrained by the resource amount, each edge server can allocate resources reasonably to maximize efficiency. Additionally, it may be assumed that each edge server can only execute at most one task at a time and the tasks in one edge server cannot be migrated to another.

The tasks offloaded from the user's end devices may be denoted by the set $T=\{T_1, T_2, \ldots, T_N\}$, with $|T_i|$ (in unit of bytes) denoting the size of task $T_i$, $1 \leq i \leq N$. Notice that in edge computing applications/services, a considerable number of tasks can be time-sensitive and thus may be subject to strict deadlines. (e.g., automated/connected vehicles, virtual reality, and real-time detection). Thus, for task $T_i$, its deadline is denoted by $T_i^d$, representing the requested response time from the users.

In order to minimize the average task response time of all tasks, the total delay $D_i$ of each task is classified into two parts: the external delay $D^e$ (mainly determined by the task dispatching) and the internal delay $D^f$ (mainly determined by the task scheduling). The total delay of task $T_i$ is defined by $D_i=D_i^e+D_i^f$, and the task would miss its deadline if $D_i>T_i^d$; otherwise, the task meets its deadline.

To be detailed below, the external delay represents the transmission delay between the users' end devices and the edge server and the internal delay represents the delay incurred within the edge server, including the processing delay and the waiting delay.

The External Delay

The external delay $D_i^e$ of a task $T_i$ may be further divided into four stages:

$D_i^{e1}$, indicating the transmission delay from the user's end device to the AP;

$D_i^{e2}$, indicating the transmission delay from the AP to the edge server;

$D_i^{e3}$, indicating the transmission delay from the edge server back to the AP; and $D_i^{e4}$, indicating the transmission delay from the AP back to the user's end device.

Accordingly, the upload delay is and the download delay is $D_i^{e3}+D_i^{e4}$.

To deliver a specific task to the edge server, the end user can first connect to the nearest AP in wireless. To indicate the connection between the tasks and APs, the following vector (for task $T_i$) is defined:

$$c_i = [c_i^1, c_i^2, \ldots, c_i^K] \quad (1)$$

where $c_i^k$ is a binary value, with $c_i^k=1$ denoting that task $T_i$ will be transmitted to the AP $c_i^k=0$ otherwise. Meanwhile, considering that the bandwidth provided by the AP is changing in real-time, the bandwidth at time t is denoted by:

$$b^w(t) = [b_1^w(t), b_2^w(t), \ldots, b_K^w(t)]^T \quad (2)$$

where $b_k^w(t)$ represents the bandwidth (in unit of bit/s) provided by AP k. In transmitting the task to the nearby AP, there is a propagation latency. The propagation latency may be denoted by $l_k$ for AP k, and since the range between the end device and the AP is relatively short (especially in the 5G case), the same propagation latency $l_k$ may be assumed for those tasks transmitted within the same AP's coverage area. Therefore, the $D_i^{e1}$ can be represented by:

$$D_i^{e1} = l_k + \frac{|T_i|}{c_i \circ b^w(t)} \quad (3)$$

where O represents the inner product, and the former and latter terms in the equation represent the propagation latency and communication latency, respectively.

The following matrix $F_i$ may be defined to represent the transfer of task $T_i$ between APs and edge servers:

$$F_i = \begin{bmatrix} f_i^{1,1} & f_i^{1,2} & \cdots & f_i^{1,J} \\ f_i^{2,1} & f_i^{2,2} & \cdots & f_i^{2,J} \\ \vdots & \vdots & \ddots & \vdots \\ f_i^{K,1} & f_i^{K,2} & \cdots & f_i^{K,J} \end{bmatrix} \quad (4)$$

Where $f_i^{k,j}$ is a binary value, with $f_i^{k,j}=1$ denoting that $T_i$ will be transmitted from AP k to the edge server $E_j$ and $f_i^{k,j}=0$ otherwise. For an arbitrary time t, the bandwidth of the link between APs and edge servers can be represented as:

$$B^n(t) = \begin{bmatrix} b_{1,1}^n(t) & b_{1,2}^n(t) & \cdots & b_{1,J}^n(t) \\ b_{2,1}^n(t) & b_{2,2}^n(t) & \cdots & b_{2,J}^n(t) \\ \vdots & \vdots & \ddots & \vdots \\ b_{K,1}^n(t) & b_{K,2}^n(t) & \cdots & b_{K,J}^n(t) \end{bmatrix} \quad (5)$$

Where $b_{k,j}^n(t)$ represents the bandwidth (in unit of bit/s) between AP k and edge server $E_j$ at time t. Note that $b_{k,j}^n(t)=0$ indicates that no connection exists between AP k and edge server $E_j$. Besides, each link between AP k and edge server $E_j$ has a propagation delay $e_{k,j}$, mainly determined by the corresponding distance. Therefore, the $D_i^{e2}$ can be represented by:

$$D_i^{e2} = e_{k,j} + \frac{|T_i|}{\|F_i \otimes B^n(t)\|_1} \quad (6)$$

where $\otimes$ represents the Hadamard product (multiplication of the corresponding elements in two matrices), and $\|\bullet\|_1$ represents the L1-norm of the matrix. Specifically, $\|F_i \otimes B^n(t)\|_1$ represents the bandwidth of the selected link, and the former and latter terms in the equation represent the propagation latency and communication latency, respectively. The data size of the processing result is assumed to be small, and only consider the propagation latency during the result downloading process, i.e., $D_i^{e3}=e_{k,j}$ and $D_i^{e4}=l_k$.

Thus, the external delay (four stages) for task $T_i$ can be expressed as:

$$D_i^e = D_i^{e1} + D_i^{e2} + D_i^{e3} + D_i^{e4} \quad (7)$$

The Internal Delay (Under Multi-Queue Weighted RR)

Figure 3:
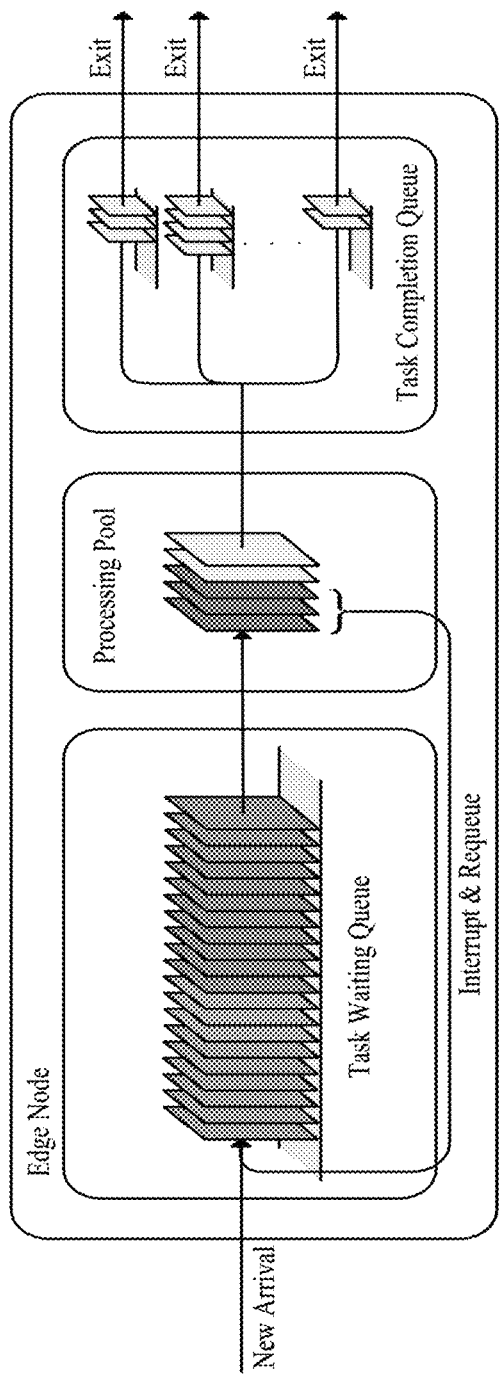
FIG. 3 illustrates a schematic diagram of an edge node utilizing a multi-queue, weighted RR scheduling method, in accordance with an embodiment of the present disclosure.

Based on the original RR model described above, a new, multi-queue weighted RR model for task scheduling is designed with the framework illustrated in FIG. 3. As a variant of RR, the multi-queue weighted RR contains two kinds of queues: one task waiting queue for the tasks arriving at the edge server yet completed, and n task completion queues for the result of completed (parts) of then waiting tasks.

Specifically, at each time, the first task in the waiting queue enters the processing pool for task processing, with a (fixed) computing capability of $C_j$ at edge server $E_j$ and a task completion queue only stores the result of the same task at a time, and thus a new task cannot enter the queue until the current task is completed.

Under the aforementioned multi-queue weighted RR model, the internal delay incurred within each edge server mainly includes two parts. For task $T_i$, its associated internal delay $D_i^f$ can be expressed by:

$$D_i^f = D_i^{fw} + D_i^{fp} \quad (8)$$

in which $D_i^{fw}$ is the task waiting time in the waiting queue and $D_i^{fp}$ is the task processing time in the processing pool. For an arbitrary task $T_i$ dispatched to edge server $E_j$, its total processing time within the edge server (when leaving the edge server) can be estimated by:

$$D_i^{fp} = \frac{|T_i|}{C_j} \quad (9)$$

Where $C_j$ represents the computing capability (i.e., the data size processed per second) at edge server $E_j$. To formulate the task scheduling process, the allocated computing resources (or allocated quantum for computing) of task $T_i$ may be defined by $q_i$. Thus, $q_i$ is a real value variable and denotes the time length that $T_i$ will be processed in each iteration in the processing pool. For the same task, a same quantum for it in each iteration is assigned.

Accordingly, the waiting time $D_i^{fw}$ of task $T_i$ in the waiting queue can be represented by:

$$D_i^{fw} = \sum_{m=1}^{M} \sum_{n=1, n \neq i}^{N} q_n \cdot \mathcal{I}_{m,n} \quad (10)$$

Where:

$$M = \left\lceil \frac{D_i^{fp}}{q_i} \right\rceil \quad (11)$$

gives the maximum number of iterations task $T_i$ needs to go through, N is the number of total tasks in the waiting queue, and $$\mathcal{I}_{m,n} = \begin{cases} 1, & \text{if } m \leq \left\lceil \frac{D_n^{fp}}{q_n} \right\rceil \\ 0, & \text{otherwise} \end{cases} \quad (12)$$

indicates whether the task has been completed in the m iteration.

Due to the limited storage resources of each edge server, the number of tasks waiting in the queue at the same time is constrained. For the tasks dispatched to edge server $E_j$, the following constraint can hold:

$$\sum_{i=1}^{N} (|T_i| + |R_i|) \leq S_j^w + \sum_{i=1}^{N} S_j^{c(i)} \quad (13)$$

where $S_j^w$ and $S_j^{c(i)}$ are the storage capacity of the task waiting queue and the n-th task completion queue at edge server $E_j$, respectively, and $|R_i|$ is the data size of results for the finished part of task Particularly, tasks in the waiting queue need to further satisfy the following constraint:

$$\sum_{i=1}^{N'} |T_i| \leq S_j^w, i \in T^w \quad (14)$$

where $T^w$ is the set of tasks in the waiting queue and N' is the number of tasks in $T^w$. In addition, the result of the finished parts of each task in the n-th completion queue can satisfy the following constraint:

$$|R_i| \leq S_j^{c(n)}, i \in T^{c(n)} \quad (15)$$

where $T^{c(n)}$ is the task in the n-th completion queue.

The Minimization of Average Task Response Time

With the above analysis and formulation, the task dispatching and scheduling processes can be described as follows. At one time, a set of tasks $T_i$ are offloaded to multiple edge servers at the network edge. For task $T_i$ specifically, it is released from a user's end device and arrives at the edge server $E_j$ after an external delay of $D_i^{e1} + D_i^{e2}$. Subsequently, task $T_i$ waits for $D_i^{fw}$ time in the waiting queue and is processed for $D_i^{fp}$ time in the processing pool. The processed task (i.e., task result) is returned to the users through the APs for a delay of $D_i^{e3} + D_i^{e4}$.

Overall, a shorter time delay means better QoS. Thus, to provide higher QoS to the users, the average delay D (or average task response time) of all tasks may be minimized by solving the following optimization problem:

$$\min_{F_i, q_i} \frac{1}{N} \sum_{i=1}^{N} (D_i^e + D_i^f) \quad (16)$$

s.t. $(13) \sim (15)$.

In the above optimization problem, the objective function is to minimize the average delay of all tasks, composed by the external and internal delays ($D_i^e$ and $D_i^f$); the constraints set the limitations of storage resources (i.e., $S_j$) and computing resources (i.e., $C_j$) provided by the edge servers. Furthermore, the transfer matrix of task $T_i$ between APs and edge servers (i.e., $F_i$ above) and the allocated quantum (i.e., $q_i$ above) are unknown variables to be solved. After solving the problem, the optimal dispatching and scheduling policy may be obtained such that the total average delay can be minimized.

When solving the aforementioned optimization problems, high computation complexity and dynamic network conditions may be two critical problems, and will be further discussed below.

High Computation Complexity

The aforementioned optimization formula has embedded NP-hard subproblems. First, the number of APs and edge servers increases from hundreds to thousands in real-world scenarios. Conventional optimization algorithms can spend a significant amount of time searching for the optimal task transmission link and edge server in dispatching. Second, users' end devices can send a large number of requests to the edge servers, leading to a complex scheduling problem. The above two challenges lead to an enormous searching space in solving the optimization problem, and thus any brute-force based searching approach is prohibited.

Dynamic Network Conditions and Server Loads

In modeled problems, it may be assumed that the network conditions and server loads are known in advance and thus essentially may be optimized accordingly. However, such assumptions are unrealistic in practice. Due to the randomness of offloaded tasks, task arrivals in the edge computing system are in random sequences and (edge) network conditions are dynamically changing, further increasing the uncertainty of task arrivals and sequences.

In consequence, the solution from an offline optimization may differ greatly from the real-world scenarios. Instead, in choosing the optimal servers for dispatching and making the optimal schedules in edge servers, both the network conditions and server loads can be estimated in real-time and taken into consideration accordingly.

An online task dispatching and scheduling method (OTDS) based on online learning (OL) and deep reinforcement learning (DRL) techniques may be used in optimizing edge computing dispatching and scheduling, as will be described below.

Overall Framework of OTDS

In the framework of OTDS, an OL-based dispatcher and a DRL-based scheduler may be utilized for task dispatching and scheduling, respectively.

Specifically, the dispatcher may incorporate a dispatching method combined with OL, which estimates the real-time states of the network conditions and server loads and then dispatch tasks to optimal edge servers accordingly while the scheduler may incorporate a scheduling method based on both the weighted multi-queue RR and DRL, which not only takes into account the different time-sensitive requirements of tasks but also adapts to the dynamic changing of server load.

By jointly tuning task dispatching and scheduling in an online, dynamic way, QoS (i.e., low average task response time) of requested tasks from the end users may be significantly be improved.

OL-Based Dispatcher at Access Point

The dispatcher is placed at the AP and its role is to dispatch tasks from the users' end devices within the coverage area of the AP to appropriate edge servers. Previous dispatching policies were based on simple dispatching models and did not consider the dynamic nature of network conditions and server loads.

In the present disclosure, an online task dispatching policy based on a multi-armed bandit (MAB) framework may allow the dispatcher to estimate the bandwidth of the network and the load of edge servers in real-time. When link congestion or server overload occurs, the dispatcher thus can turn to links and servers with lower utilizations.

DRL-Based Scheduler at Edge Server

Figure 4:
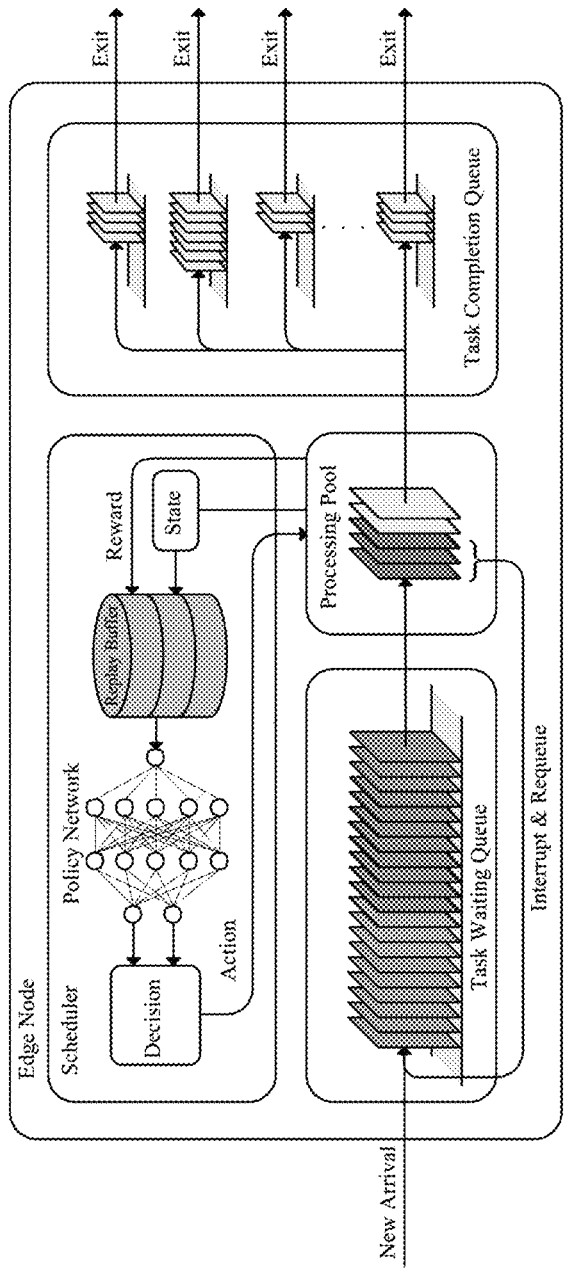
FIG. 4 illustrates a schematic diagram of an edge node utilizing a DRL-based scheduling method, in accordance with an embodiment of the present disclosure.

On the basis of the multi-queue weighted RR model described above, a new scheduling model, consisting of three modules of scheduler, queue buffer, and processing pool may be used, as illustrated by FIG. 4. The new scheduling model combines with multi-queue weighted RR methods and DRL techniques to adaptively allocates computing resources to tasks with different time-sensitive requirements.

The role of the scheduler is to determine the quantum of each task (i.e., $q_i$) allocated in each iteration of the weighted multi-queue RR model. In detail, the tasks firstly enter the task waiting queues of edge servers. Then, in an iterative manner, each task enters the processing pool.

During this process, the scheduler obtains the basic information of the current task (such as the task size, deadline, etc.), so as to generate the state of the environment in DRL. After iterating through the policy network, the scheduler generates a vector representing the quantum $q_i$ assigned to the current task in the processing pool. The scheduler then allocates the computing resources to the task, based on the returned quantum $q_i$.

After each iteration, following the DRL procedure, the scheduler would update its scheduling policy simultaneously, referring to the reward from the decision made in the last iteration.

An OL-Based Task Dispatching Method

An online dispatching approach based on the MAB framework, which exploits past experience (i.e., the historical path and server selection) to estimate the current state of the environment (i.e., the real-time bandwidths of transmission paths and loads of servers) is described herein, so as to choose the optimal edge server to offloading tasks.

In accordance with embodiments of the present disclosure, the following components of the MAB framework are detailed below:

Components & Concepts

Arm: In the MAB problem, the fundamental component is the arm and the optimal arm from all arms may be selected in each iteration. In the present disclosure, an edge server is treated as an arm and $\mathcal{J} = \{1, \ldots, J\}$ is utilized to denote the set of J arms. The algorithm must decide which arm to choose at each time, based on the reward from the previous t−1 choice.

Reward: after selecting the target arm, the algorithm will receive the compound reward after interacting with the environment. It contains two parts, $u_j(t)$ and $v_j(t)$, which is the measure of external delay and internal delay, respectively. $u_j(t)$ and $v_j(t)$ are defined as:

$$u_j(t) = \exp(-(\mathcal{D}_i^{e2} + \mathcal{D}_i^{e3})) \quad (17)$$

$$v_j(t) = \frac{\mathcal{D}_i^{fp}}{D_i^f} \quad (18)$$

Specifically, $u_j(t)$ is the measure of the external delay and is negatively correlated with the length of the external delay and $v_j(t)$ is the measure of the internal delay, wherein a higher value means shorter task waiting time and lower server load. The definition of the compound reward is $g_j(t) = u_j(t) + \alpha v_j(t)$, $0 \leq \alpha \leq 1$.

The weight of the arm updates only if task $T_i$ completes processing and returns to the user's end device. Otherwise, the weight of the arm is maintained. It may be desirable to maximize the total compound reward in time T, i.e., $$\mathbb{E}\left[\sum_{t=1}^{T} g_{j(t)}(t)\right],$$

where j(t) is the arm selected at time t.

Regret: in order to improve the efficiency of the algorithm, the concept of regret was introduced in MAB. Regret is the difference of the reward between the optimal arm and the selected arm. Let $J^*(t) = \max_j g_j(t)$, $1 \leq j \leq J$ in which $j^*(t)$ is the optimal arm in time t. It may be desirable to design a policy π to choose the arm j(t) so that the regret compared with the Oracle is as small as possible. Specifically, the Oracle is a policy that knows all the parameters of the network and the edge servers all the time, thus it can select the optimal arm j*(t) at each time t Regret for policy π is defined as:

$$R_\pi(t) = \mathbb{E}\left[\sum_{t=1}^{T} g_{j*(t)}(t) - g_{j(t)}^\pi(t)\right]. \quad (19)$$

Since Oracle has the full knowledge of the parameters $u_j(t)$ and $v_j(t)$, it can select the optimal arm all the time. However, these parameters can only be estimated when choosing the arm j(t) at each time. As such, it may be difficult to design a policy π to maximize the total compound reward (or minimize the total regret) with partial knowledge.

Method Design

---

Algorithm 1: Task Dispatching Algorithm with OL

---

Input: The set of tasks T = {T1, T2, . . . , Tn}
Output: Selected arm j(t), 1 ≤ t ≤ T
1   for t = 1 : J do
2      | Select arm j(t) = t;
3      | Receive uj(t) and vj(t) of arm j;
4      | Arm j's compound reward gj(t) = uj(t) + vj(t);
5      | Update arm j's mean compound reward Mj(t);
6      | Nj(t) = 1;
7   end
8   for t = J + 1 : T do
9      | Select arm j(t) = argmaxj $\left[M_j(t) + c\sqrt{\frac{\ln t}{N_j(t)}}\right]$;
10     | Receive uj(t) and vj(t) of arm j;
11     | Arm j's compound reward gj(t) = uj(t) + vj(t);
12     | Update arm j's mean compound reward Mj(t);
13     | Nj(t) = Nj(t − 1) + 1;
14  end

---

The design of the online dispatching policy of the present disclosure is provided by using the Upper Confidence Bound (UCB) method. UCB chooses the arm with the max mean-value which contains the compound reward of arm j in the previous t−1 time and a bonus. Specifically, bonus is essentially the standard deviation of the mean-value, which reflects the instability of the candidate's arm and is the upper bound of the confidence interval. At each step, the algorithm follows the principle of optimism-in-face-uncertainty to choose the candidate arm with the highest upper confidence bound, defined by:

$$j(t) = \text{argmax}_j\left[M_j(t) + c\sqrt{\frac{\ln t}{N_j(t)}}\right], 1 \le j \le J, \quad (20)$$

where $M_j(t)$ is the mean of the compound reward of arm j, $N_j(t)$ is the number of times the arm j is selected and c is a parameter to control the balance between exploration and exploitation. As such, the weight of each arm is defined by $$M_j(t) + c\sqrt{\frac{\ln t}{N_j(t)}}$$

and when the task is completed, the selected arm (i.e., the selected edge server) may update its corresponding weight according to the completion time of the task. The task dispatching algorithm with OL is depicted by the pseudo-code in Algorithm 1. At first, the algorithm will choose each arm once in order to obtain the initial compound reward of each arm (Lines 1-7 in Alg. 1). Then, it will select the arm with the highest upper confidence bound (Lines 8-14 in Alg. 1). During the learning process, a weight a is set in the reward functions as 1, and the parameter c in Eq. 20 is configured to 0.3. Besides, it is confirmed in that it enjoys simple computations per round as well as O (log T) regret guarantee.

A DRL-based Task Scheduling Method

The DRL-based scheduling applies the deep Q-network (DQN) for policy training and can minimize the internal delay (i.e., $D_i^f$) of task $T_i$ by adapting to the state of the environment at the edge server.

Components & Concepts

The task scheduling policy is generated by deep reinforcement learning: The agent learns by interacting with a dynamic environment and generates actions in the environment to maximize rewards. A typical reinforcement learning model consists of agent, state, action, policy and reward, whose details in the model of the present disclosure are explained in the following:

Agent: the role of the agent (scheduler) in the edge server is to decide the quantum of each operation based on the current state of the environment. It improves decision-making skill through interacting with the environment. The goal of the scheduler is to make the optimal decision in each round to minimize the overall average task response time of tasks in T.

State: the scheduler interacts with the environment to reach the current state. When a task enters the processing pool, the scheduler will obtain the state of the current task and the tasks in the task waiting queue. The state of edge server $E_j$ is represented by s(t)={$D_0^{f_p}(t)$, $D_0^{f_w}(t)$, $D_1^{f_w}(t)$, ..., $D_n^{f_w}(t)$}, in which $D_0^{f_p}(t)$ and $D_0^{f_w}(t)$ represents the remaining processing time and waiting time of task in the processing pool at time t, respectively. And $D_1^{f_w}(t)$~$D_n^{f_w}(t)$ represent the waiting time of tasks in the waiting queue.

Action: by observing the current state of the environment, the agent will take action accordingly. In the OTDS, the key step of task scheduling is to choose the quantum that indicates how much computing resources will be assigned to the current task, in other words, how long it will be served. An action can be represented by vector a(t) which means the specific quantum $q_i(t)$ of task $T_i$ in this round on the edge server $E_j$. Besides, the quantum must be smaller than the remaining processing time of the task in the processing pool (i.e., $q_i(t) \le D_0^{f_p}(t)$).

Policy: a task scheduling policy ψ(s(t)): S→A defines the mapping relationship from the state of the tasks to the action where S and A represent the state space and action space, respectively. Specifically, the scheduling policy indicates a set of actions a(t)=ψ(s(t)), which maps the task state to action at time t. In deep reinforcement learning, policy design is the most important part, which is generated in the neural network through interactions with the environment.

Reward: after observing the state of the task in the processing pool and tasks in the task waiting queue at time t, the agent will take action according to the scheduling policy, then receive the reward at time t+1. Afterward, the agent will update the scheduling policy network according to the reward, so as to make the optimal action in the next decision. Since the agent's goal is to maximize the total reward, the agent will tend to make optimal actions in continuous interaction with the environment. The details of the reward function are further described below.

To sum up, the online task scheduling policy is based on the DRL and its goal is to make the optimal action in every decision to maximize the total reward.

Reward Function Design

After the agent completes each decision and interacts with the environment, it will evaluate the effect of the action through the reward function so that the agent can make better performance in the subsequent actions. In general, the goal of an agent is to maximize the total reward by iteratively updating the policy network so that each action is optimal.

At time t, the scheduler will observe the state s(t) of the current task in the processing pool and the tasks in the waiting queue, and it will make the action a(t) after the policy network iteration, OTDS will evaluate the performance of the action using the following reward function:

$$R(s(t),a(t)) = \exp(-(V_t^{waiting} + \mu V_t^{processing})) \quad (21)$$

where $0 < \mu < 1$ are weights;

$$V_t^{waiting} = \frac{1}{N} \sum_{i=1}^{N} D_i^{fw}(t)$$

indicates the average waiting time of tasks in the task waiting queue. It indicates a long-term and overall reward. If the scheduler makes a good decision, it can produce a proper quantum so that the average waiting time of all tasks will be small;

$V_t^{processing} = D_0^{fw}(t)$ indicates the waiting time of the task in the current processing pool at time t. It indicates a short-term and local reward. A good scheduling strategy allows most tasks to be processed in sufficient time without exceeding the deadline due to the long waiting time.

At time t, the agent evaluates the performance of the decision by the reward r(t) returned by the reward function R(s(t), a(t)). For the deep reinforcement learning task, the goal is to maximize the expected cumulative discounted reward which can be measured by:

$$\mathbb{E}\left[\sum_{t=0}^{\infty} \gamma^t R(s(t), a(t))\right] \quad (22)$$

where $\gamma \in (0, 1]$ is a factor discounting future rewards.

Learning Process Design

Figure 5:
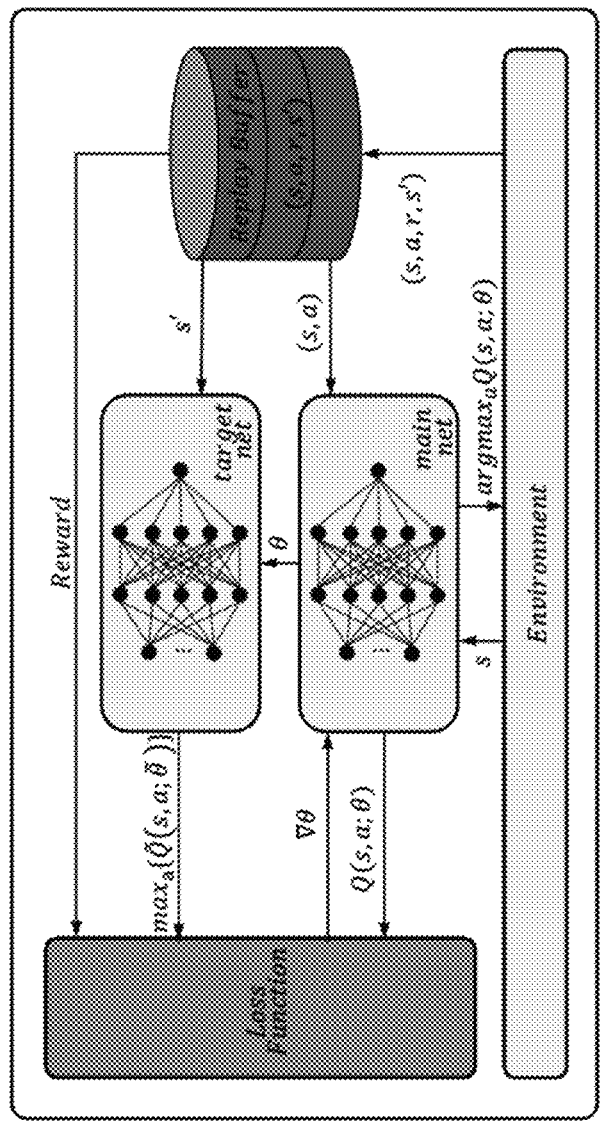
FIG. 5 illustrates a schematic diagram of the learning process of a DQN in a scheduler, in accordance with an embodiment of the present disclosure.

In traditional Q-learning, since the state space and action space are discrete and the dimensions are small, each state-action pair can be stored into a Q-table easily. However, if the task state space and the action space are continuous and large, as in the present disclosure, it is very difficult to put the state-action pair into a Q-table. To solve this problem, the DQN model may be utilized to combine the convolutional neural network with the Q-learning algorithm and transform the Q-table into a Q-network. The learning process of DQN is shown in FIG. 5 and mainly relies on the following key techniques:

Replay Buffer: deep neural networks require data to be independently and uniformly distributed (i.i.d) to perform well. However, there is a correlation between the obtained data from traditional Q-learning. In order to break the correlation between data, DQN adopts the method of experience replay to solve this problem. After interacting with the environment, the agent will store the experience in the form of ⟨s(t), a(t), r(t), s(t+1)⟩ into the replay buffer. The agent will randomly select a mini batch of experiences ⟨s(t), a(t), r(t), s(t+1)⟩ from the replay buffer every k time step, then the algorithm updates the network parameters θ by means of stochastic gradient descent (SGD) as shown in follows:

$$\theta_{i+1} = \theta_i + \sigma \nabla_\theta \text{Loss}(\theta) \quad (23)$$

where σ is the learning rate.

By using experience replay buffer, the influence of correlation between samples can be avoided and the efficiency of data usage can be improved.

Neural Network: there are two neural networks with the same structure but different parameters in DQN, the target net and the main net. The main net generates the current Q-value, and the target net generates the target Q-value. Specifically, Q(s, a; θ) represents the output of the main net and is a value function used to evaluate the current state-action pair. $\tilde{Q}$ represents the output of the target network, and $r + \gamma \max_a Q(s', a'; \tilde{\theta})$ is generally used to approximate the optimization goal of the value function, namely the target Q-value. The parameters in the main net are updated in real-time. Every time steps, the target network copies the parameters from the main network. The network updates parameters by Eq. 25 and Eq. 26 to minimize the mean squared error (MSE) between the current Q-value generated by the main net and the target Q-value generated by the target net.

After the introduction of the target network, the target Q-value generated by the target net will remain unchanged for a period time, which can reduce the correlation between the current Q-value and the target Q-value and improves the stability of the algorithm.

The loss function of Q-learning is based on the Bellman Function, and the effect of the neural network model and the objective of the optimization is defined by the loss function. It evaluates the performance of the model by the difference between the expected value and the real value. Q-learning uses the following loss function for updating and learning:

$$Q(s,a) \leftarrow Q(s,a) + \rho[r + \gamma \max_a Q(s',a') - Q(s,a)] \quad (24)$$

where ρ is learning rate and γ is the discount accumulative factor.

The agent selects the action a' of maximum Q-value from the next state s', $r + \gamma \max_a Q(s', a')$ is the estimated Q-value, and Q(s, a) is the real Q-value.

The way of updating of DQN is similar to Q-learning, but DQN uses a neural network as the approximation function of the Q-value. The loss function of DQN is defined as follows:

$$\text{Loss}(\theta) \leftarrow E[(\tilde{Q} - Q(s,a;\theta))^2] \quad (25)$$

where θ is the network parameters of the main net, $\tilde{Q}$ and is the Target Q-value and calculated by:

$$\tilde{Q} \leftarrow r + \gamma \max_a Q(s',a';\tilde{\theta}) \quad (26)$$

where $\tilde{\theta}$ is the network parameters of the target net and it updates every τ time slots by coping from the main net.

---

Algorithm 2: Task Scheduling Algorithm with DRL

Input: Task set T = {T1, T2, . . . , Tn}
Output: Quantum a(t), 1 ≤ t ≤ T
1    Initialize replay buffer (RB) to capacity N;
2    Initialize main net Q with random weights θ;
3    initialize target net $\tilde{Q}$ with weights $\tilde{\theta}$ = θ;
4    for episode = 1 : MaxLoop do
5        | for t = 1 : T do

| Algorithm 2: Task Scheduling Algorithm with DRL |
| --- |
| 6       \|    \| Get environment state s(t) ; |
| 7       \|    \| $a(t) = \begin{cases} \mathrm{argmax}_a Q(s(t), a(t); \theta), & prob. \ \epsilon \\ \mathrm{random\ action}, & prob. \ 1-\epsilon \end{cases}$ |
| 8       \|    \| Execute action a(t) and receive r(t) and<br>           \| s(t + 1); |
| 9       \|    \| Store <(s(t), a(t), r(t), s(t + 1)> into RB; |
| 10     \|    \| Randomly sample a mini-batch of experience<br>           \| <s(i), a(i), r(i), s(i + 1)> from RB by every κ<br>           \| steps; |
| 11     \|    \| $f(t) = \begin{cases} r(t), \text{ terminates at step } t+1 \\ r(t) + \gamma \max_a \{\tilde{Q}(s', a'; \tilde{\theta})\}, \end{cases}$<br>      else |
| 12     \|    \| Perform SGD on (f(t) − Q(s, a; θ))2 w.r.t. θ; |
| 13     \|    \| Set $\tilde{Q}$ = Q by every τ steps; |
| 14     \| end |
| 15     end |

The scheduling algorithm is summarized in Algorithm 2. The scheduler first initializes the replay buffer and network parameters θ (Line 1-3 in Alg. 2). After obtaining the state s(t) of the environment, the agent selects the action a(t) with the method of ε-greedy, that is, randomly selects the action with the probability of ε, and chooses the action with the maximum of Q⟨ s(t), a(t); θ⟩ with the probability of 1−ε (Line 6-7 in Alg. 2). After performing the action and interacting with the environment in the processing pool, the agent will receive the reward r(t) and observe the next state s(t+1) of the environment, then store the state ⟨ s(t), a(t), r(t), s(t+1)⟩ into the RB. Then, the agent updates the network parameters by Eq. 23 through randomly sampling a mini-batch experience from the RB by every K steps (Line 8-10 in Alg. 2). After each episode of interaction with the environment, the agent updates the network parameters by means of stochastic gradient descent. At every τ step, the target net will copy the parameters of the main net for updating (Line 11-13 in Alg. 2). During the learning process, weight μ in the reward functions is set as 1, the learning rate σ is 0.001, the ε in ε-greedy method is 0.9, the discount accumulative factor γ is 0.9, and the step parameters τ and κ are both 2000. The performance (e.g., converge time) of the DRL-based scheduler is discussed in the next section, and its learning process is shown in FIG. 11.

Experimental Settings

The data set from Google Cluster is utilized, which includes the information of the arrival time, processing time, deadline, etc. The data set consists of 5000 tasks, which may be divided equally into ten non-overlapping data groups, each of which contains 500 tasks (as shown in the left subfigure of FIGS. 6A and 6B). These tasks include not only large tasks such as big data analysis and real-time video processing but also small tasks such as image processing in virtual reality. The characteristics such as task arrival density and task processing time of each data group are different, so the corresponding data group can be selected according to the experimental requirements. the real network topology is utilized, in which 10 points are selected randomly to place edge servers and make simulation experiments.

The experiment is conducted on several laptops which act as edge servers (CPU: Intel i7-9750H 2.6 GHz; Memory: 16 GB DDR4 2666 MHz; OS: 64-bit Ubuntu 16.04) and the software is developed in Python 3.7. Experiment attempts of the present disclosure answer the following questions:

How does OTDS perform in practice when dispatching? Experiments show that the average task response time and deadline missing rate of the tasks dispatched by OTDS are lower than baselines due to dynamically adjusted according to the bandwidth of the edge network and the load of the edge servers. It updates the weight of the arms according to the reward r(t) so that it can select the optimal arm every time.

How does OTDS perform in practice when scheduling? Experiments show that the average task response time and deadline missing rate of the tasks scheduled by OTDS is lower than the baselines under different task numbers and task densities. Through continuous learning of experience, OTDS can make the optimal action in each round, so as to reduce the average task response time while maintaining the deadline missing rate at a very low level.

How does OTDS perform in tradeoff fairness and efficiency? Experiments show that as the number of large tasks arriving at the edge server increases, OTDS is better able to balance the use of the resources for the large and small tasks compared to other baseline methods, enabling all tasks to obtain sufficient resources. Therefore, the average task response time of large tasks is lower than the baselines.

Baselines

In order to better evaluate the performance of OTDS and reflect the efficiency and fairness of OTDS in task dispatching and scheduling, comparison experiments were conducted with the following three types of baseline algorithms:

Dispatching Method Baselines: To show the performance of the dispatching method of the present disclosure, three baseline dispatching methods are compared with each other:

Nearest: Dispatch task $T_i$ to the nearest edge server with minimal $D_i^{e-u}$.

Random: Dispatch task $T_i$ randomly to an edge server.

Least Load: Dispatch task $T_i$ to the edge server $E_j$ with minimal waiting time $D_i^{i-w}$.

AUSP: Dispatch task $T_i$ to the edge server $E_j$ according to the Thompson Sampling method.

Scheduling Method Baselines: To show the performance of the scheduling method of the present disclosure, three baseline scheduling methods are compared with each other:

First-Come-First-Serve: Schedule tasks according to the order of task arriving time. The early tasks are scheduled earlier, and the last tasks are scheduled later.

Shortest-Job-First: Schedule tasks according to the processing time $D_i^{fp}$ of tasks in T. Tasks with small $D_i^{fp}$ are scheduled earlier and tasks with large $D_i^{fp}$ are scheduled later.

Traditional Round-Robin: Assign a fixed quantum $q_i$ to the task at the processing pool, and queue again at the tail of the waiting queue if the task cannot be completed within the quantum.

CECS-A3C: Allocate computing resources according to the task's time-sensitive requirement based on the deep reinforcement learning.

Dispatching & Scheduling Method Baselines: a pair of dispatching and scheduling baselines is combined to compare the performance of dispatching and scheduling together. They are namely Nearest+FCFS (NF), Random+SJF (RS) and Least Load+RR (LR), AUSP+CECS-A3C (AC).

Evaluation Results

Accordingly, the performance between OTDS and the baselines on the efficiency and fairness of tasks through the evaluation results is described below.

Influence of the Number of Tasks

Figure 6A:
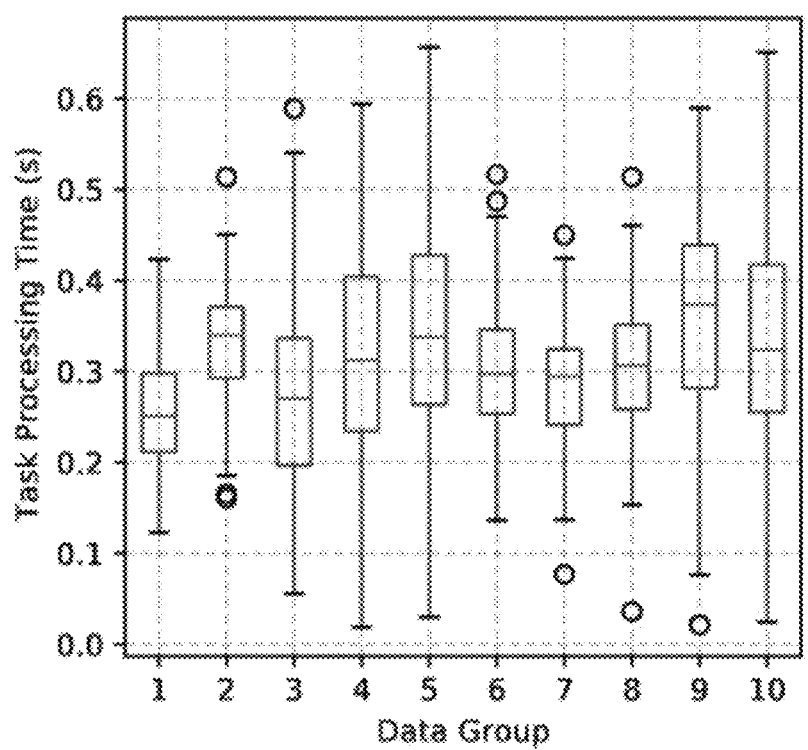
Figure 6B:
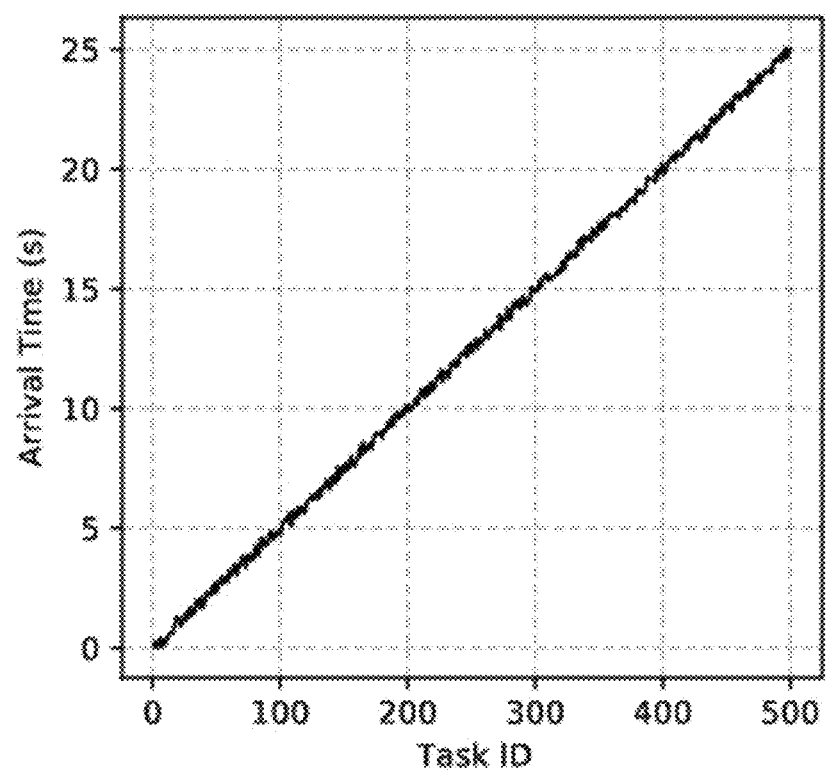
Figure 7A:
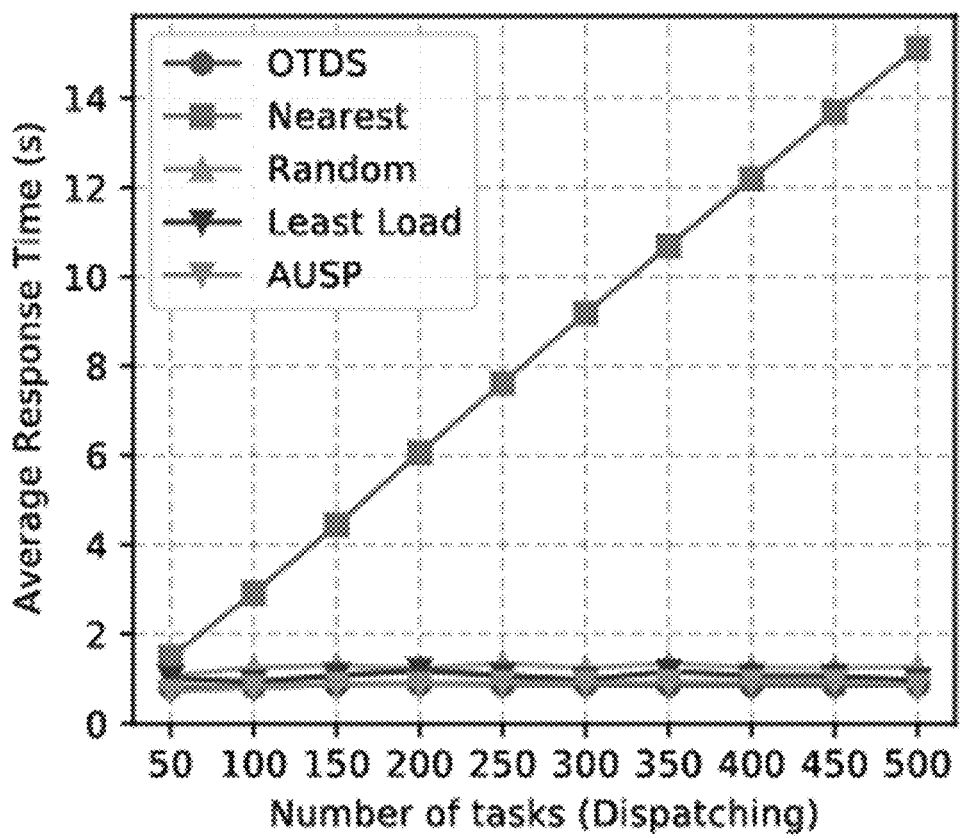
Figure 7B:
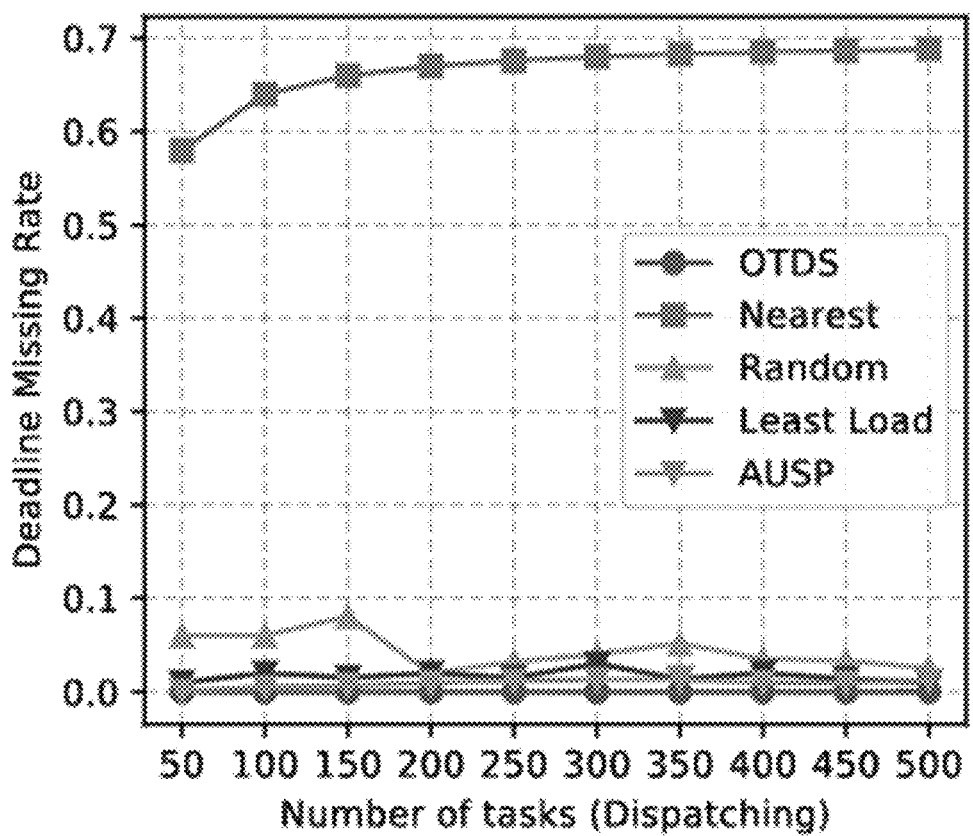
Figure 7C:
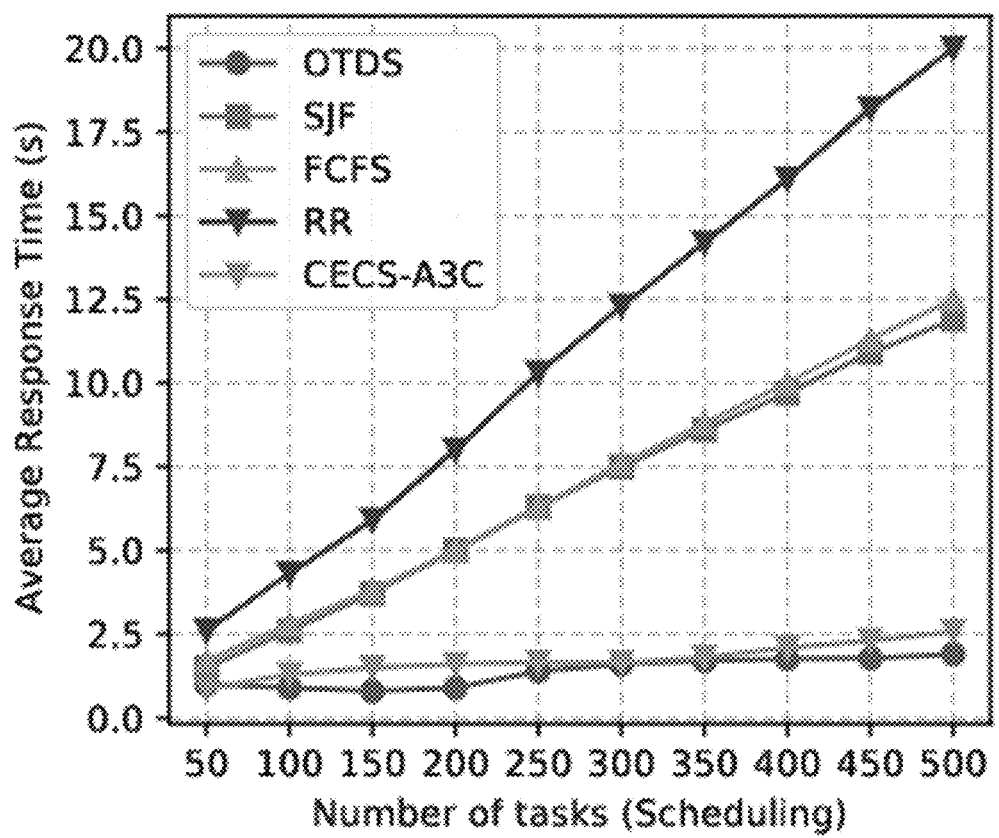
Figure 7D:
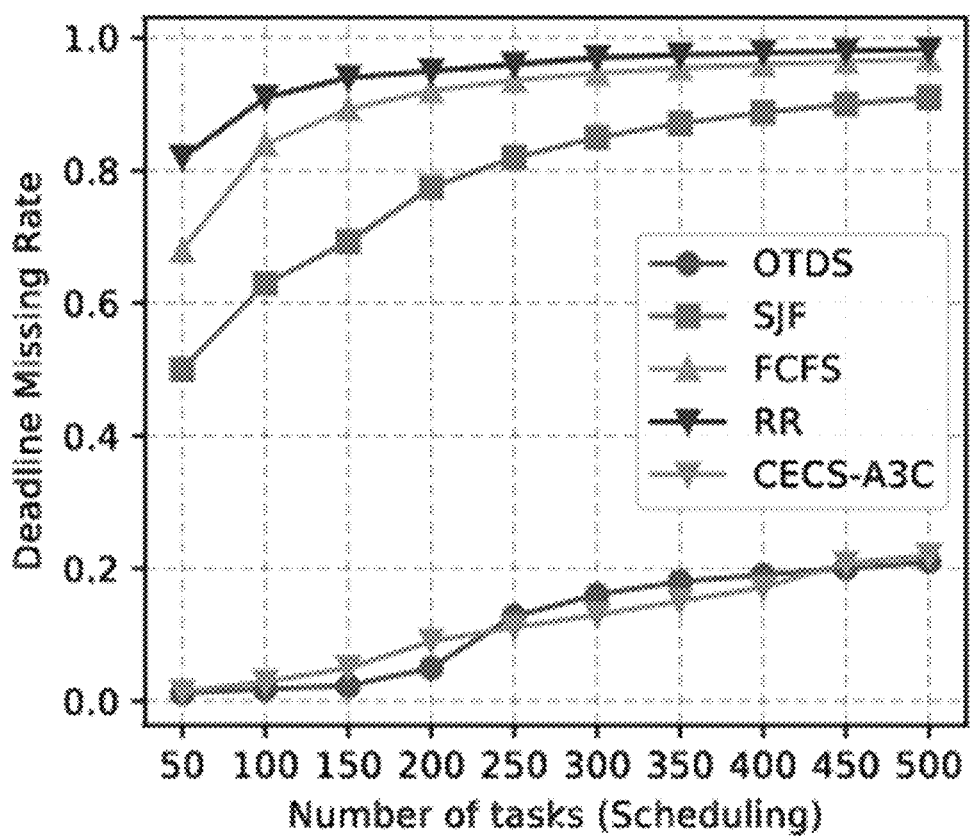
Figure 7E:
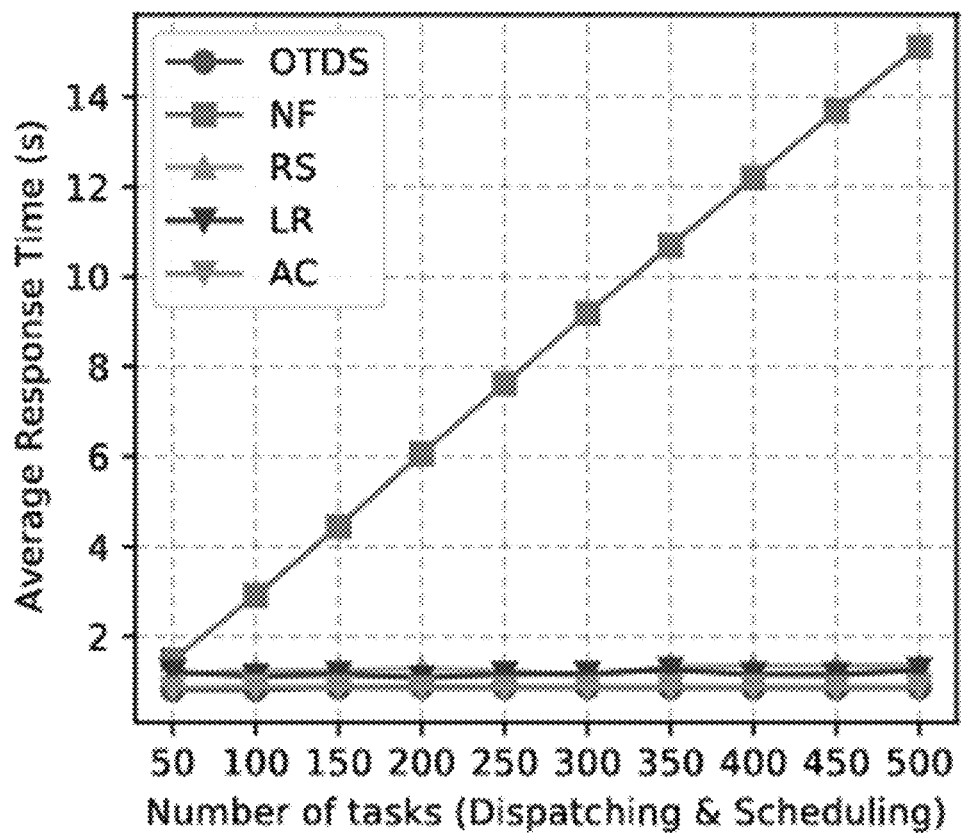
Figure 7F:
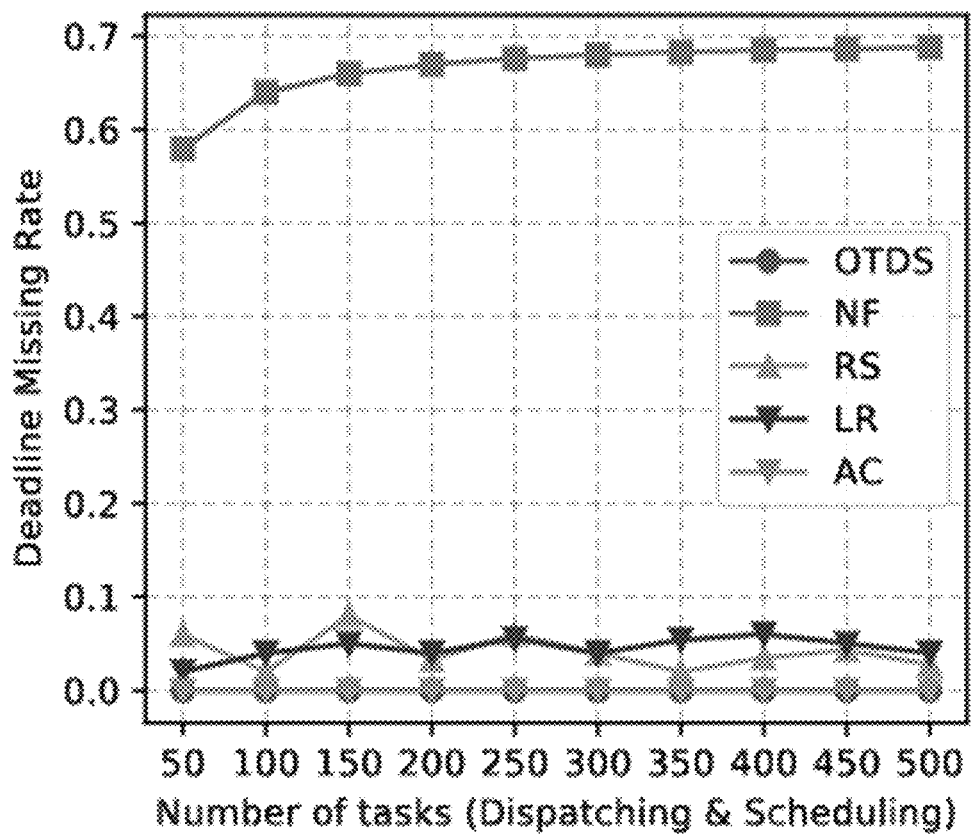
Figure 8A:
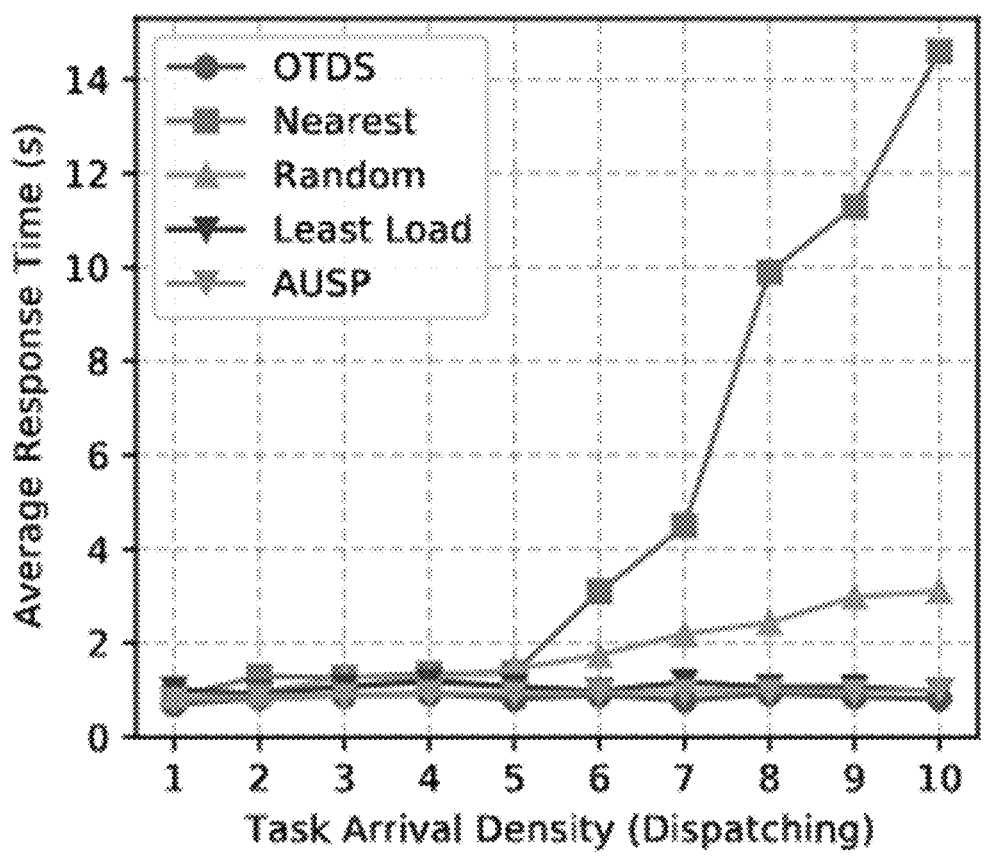
Figure 8B:
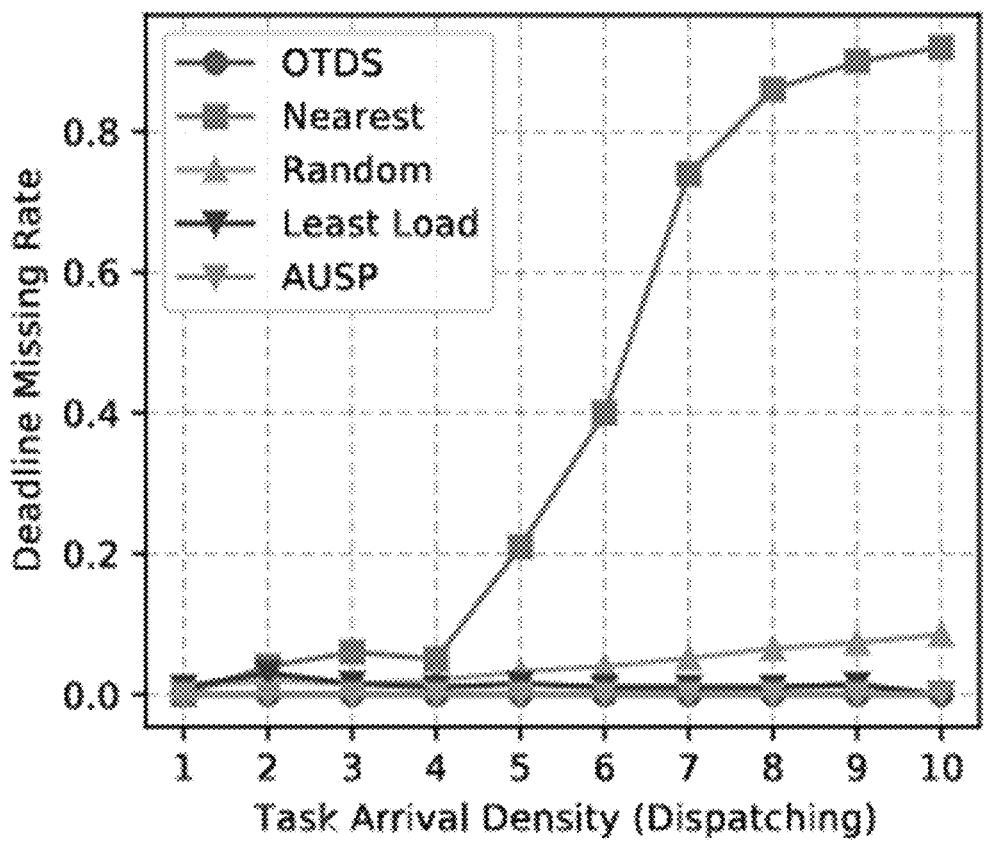
Figure 8C:
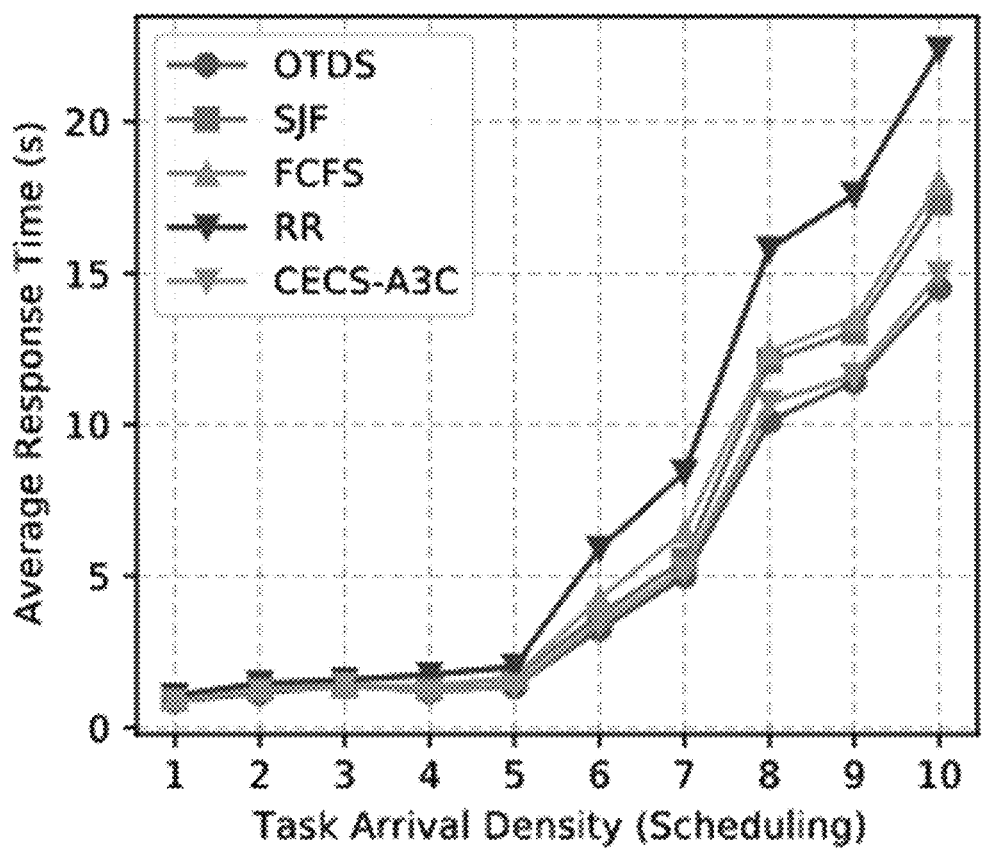
Figure 8D:
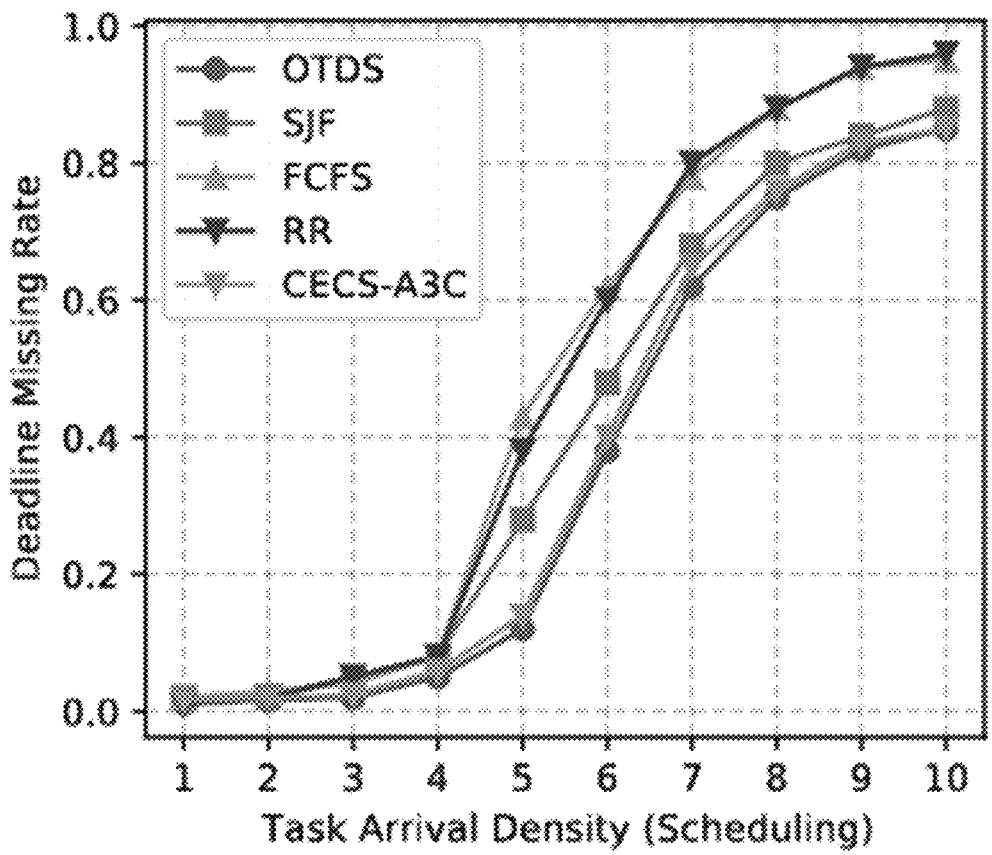
Figure 8E:
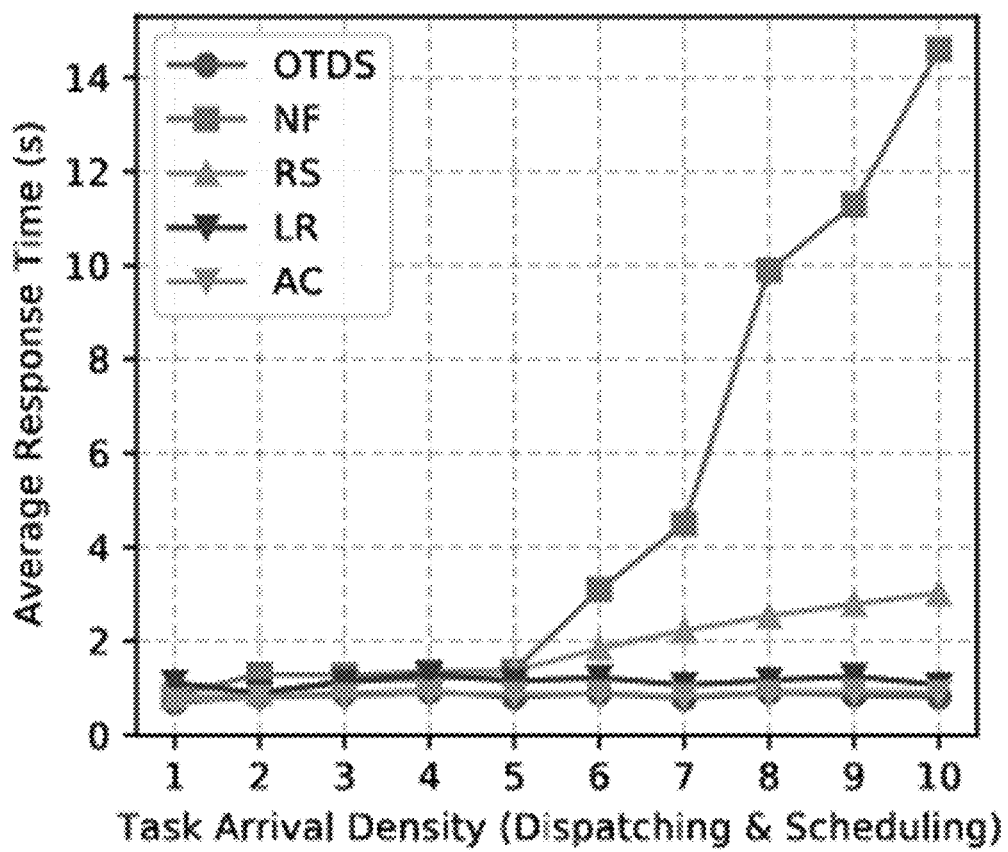
Figure 8F:
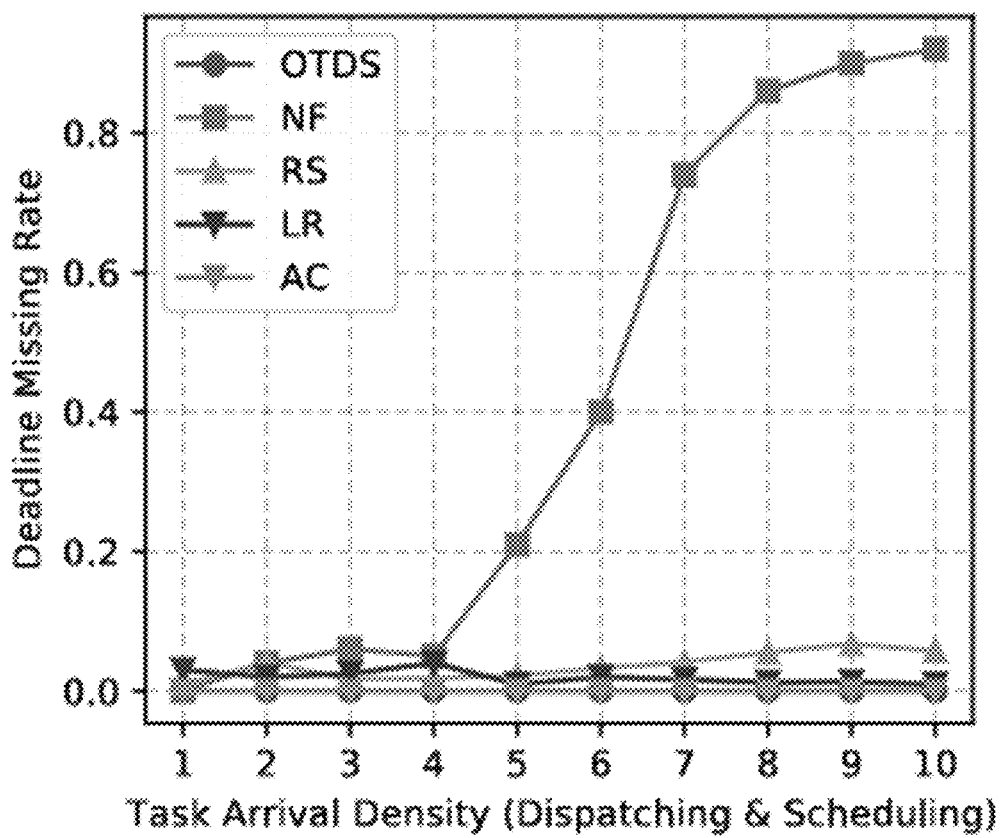

The data group 1 is selected to conduct the experiment and the tasks uniformly arrive at the edge servers, with the task processing time less than 0.5 seconds (the right subfigure of FIGS. 6A and 6B). Specifically, the first 50, the first 100, . . . , the first 500 tasks in the data group are utilized to compare the performance of different methods in terms of average task response time and deadline missing rate, respectively.

As shown in FIGS. 7A-7F, for the dispatching method, Least Load only considers the computing resources of the task dispatching process, and Nearest only considers the network resources of the task dispatching process. OTDS and AUSP both consider dynamic environment leading to the best performance. Since Nearest only offloads the tasks to the nearest edge server, the average task response time and deadline missing rate will be very large due to the overload of the edge server. On the contrary, OTDS dynamically dispatches tasks to the optimal edge server based on current network bandwidth and server load, so as to avoid link congestion and server overload.

For the scheduling method, the experience on a single edge server is conducted to compare the performance of different scheduling methods. FCFS is a non-preemptive method that allocates computing resources to the task which firstly arrives at the edge server. However, when tasks continue to arrive at the edge server, the later tasks would wait longer time, resulting in missing their deadlines. The basic idea of SJF is to give higher priority to the small task. But the large tasks which arrive at the edge server earlier will not obtain computing resources due to the low priority, eventually leading to missing deadlines. RR ignores the different time-sensitive requirements of tasks and allocates computing resources equally to each task, which leads to the failure of large tasks to obtain enough resources and misses the deadline. OTDS and CECS-A3C both perform better than other baseline methods by dynamically assigning computing resources to tasks based on their time-sensitive requirements and improving scheduling capabilities through the learning experience.

Influence of the Task Arrival Density

Task arrival density represents the number of tasks arriving at the edge server per unit time. As shown in FIGS. 8A-8F, 1 to 10 represents different task arrival density, specifically, 1 represents very low task arrival density, and 10 represents very high task arrival density. The performance of different algorithms is compared by experimenting on tasks with different task arrival densities.

As shown in FIGS. 8A-8F, the performance of different methods is measured in terms of the average task response time and deadline missing rate. For the dispatching method, OTDS, AUSP and Least Load can dispatch tasks to the least loaded server, so the edge servers can cope with the pressure of server overload caused by the increased task density. For the scheduling method, as the task arrival density increases, the average task response time of the task also increases. Since RR allocates the same resources to each task, the average waiting time of each task will be relatively large, which leads to its worst performance. OTDS can adjust the scheduling policy according to the time-sensitive requirements of the offloaded tasks, so as to minimize the average response time. Therefore, OTDS has the best performance compared with other methods. Besides, in terms of the deadline missing rate, OTDS also has better results. On the same task arrival density data set, the deadline missing rate is much lower than baselines.

Influence of the Number of Edge Servers

Figure 9A:
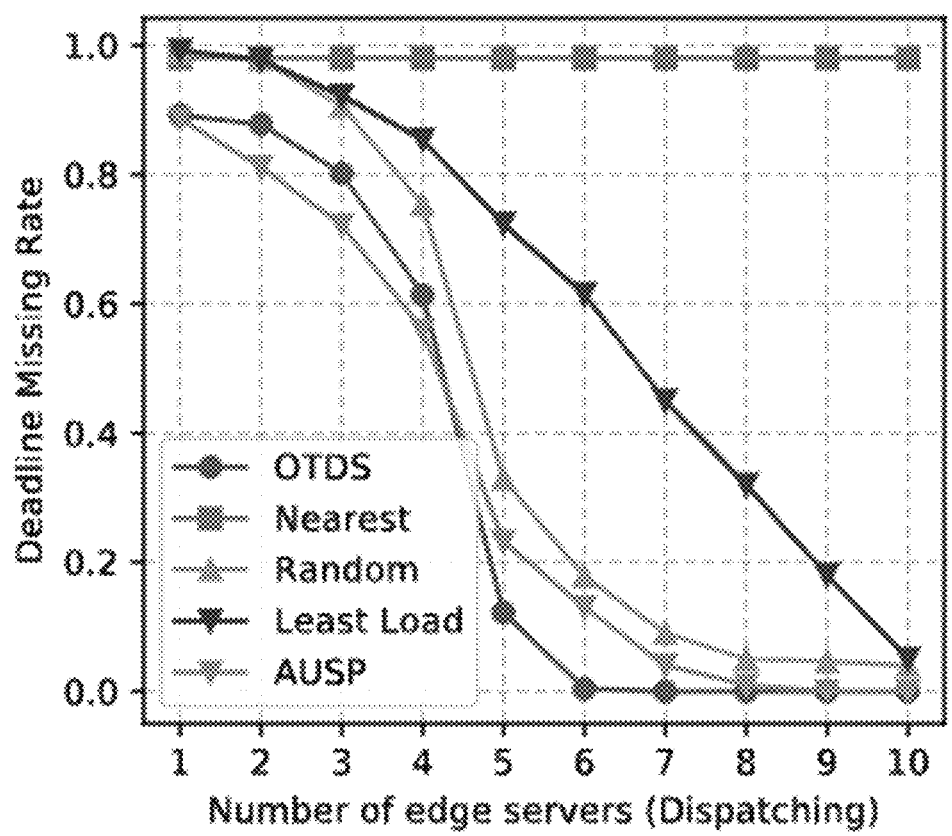
Figure 9B:
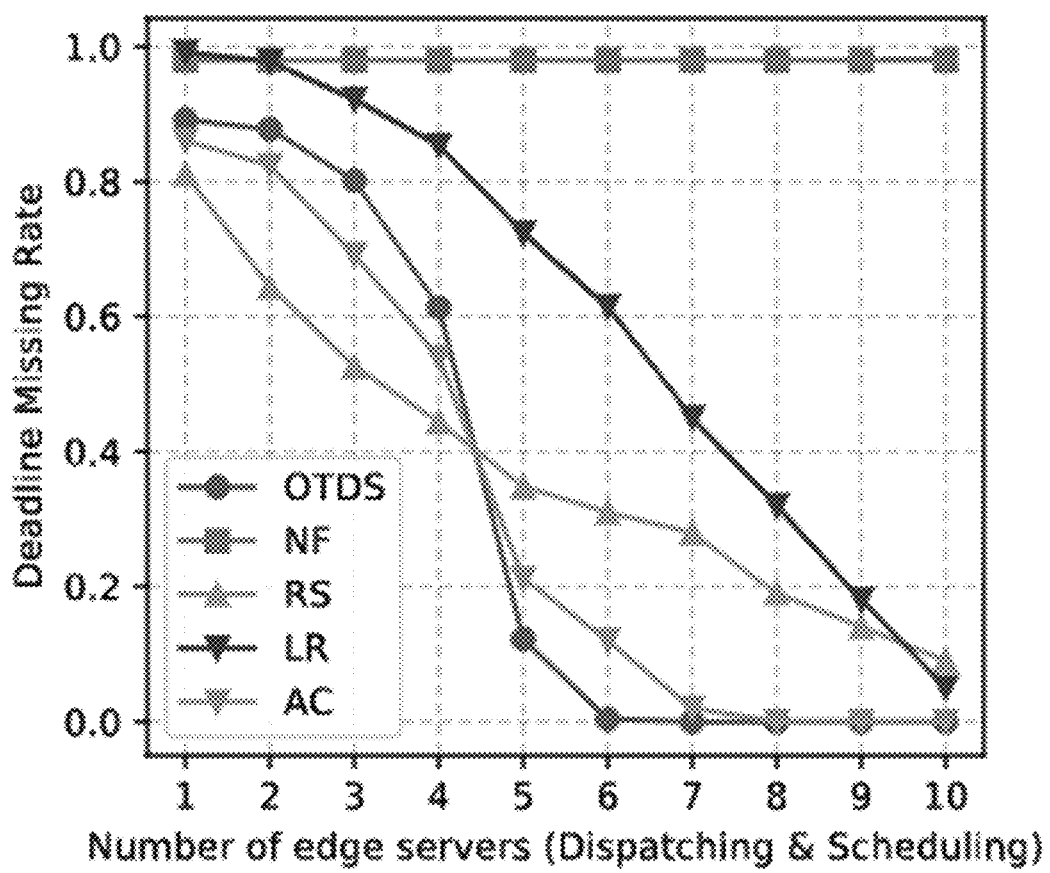

The performance of different methods may be compared through a different number of edge servers, as shown in FIGS. 9A-9B. As shown, when the number of servers is small (less than 3 edge servers), the deadline missing rate is very high. This is because the offloaded tasks are dispatched to only several servers, which results in server overload. However, as the number of servers increases, the task missing rate decreases because there are more edge servers to offload tasks. Among all methods, OTDS has the best performance. In the case of five servers, the task missing rate can approach 0, while other methods need 2×-3× edge servers than OTDS to achieve the same performance.

Influence of the Proportion of Elephants

Figure 10A:
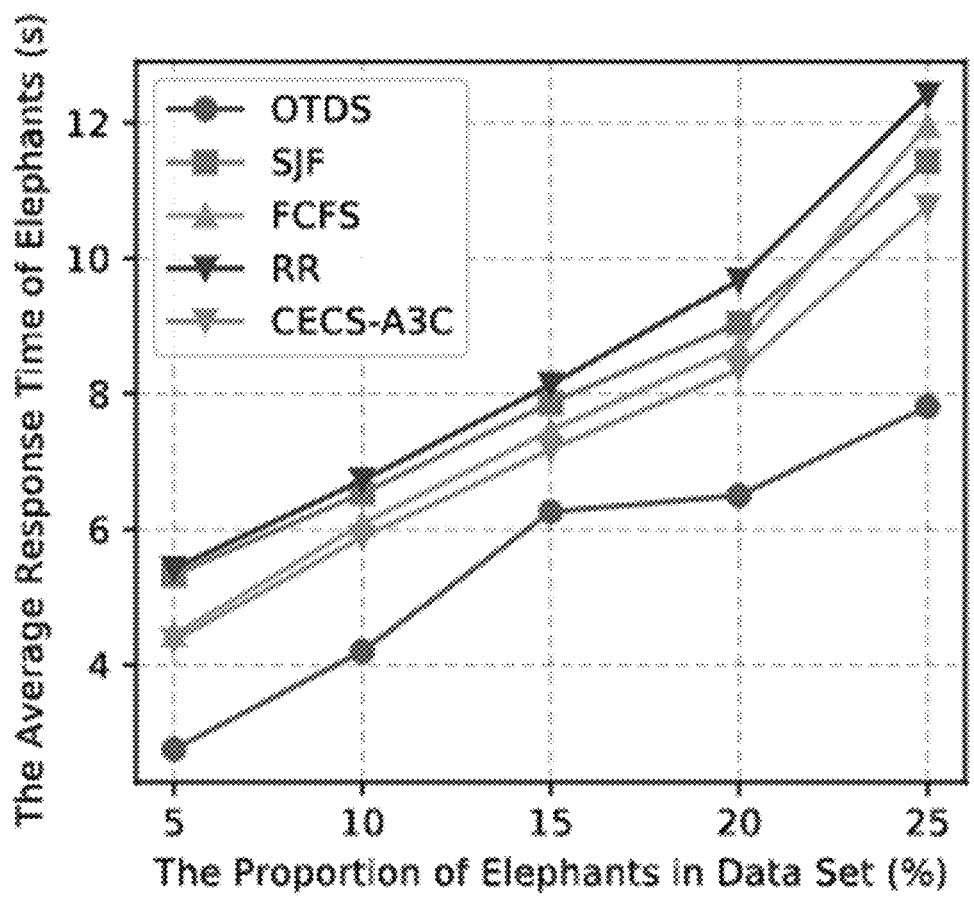
Figure 10B:
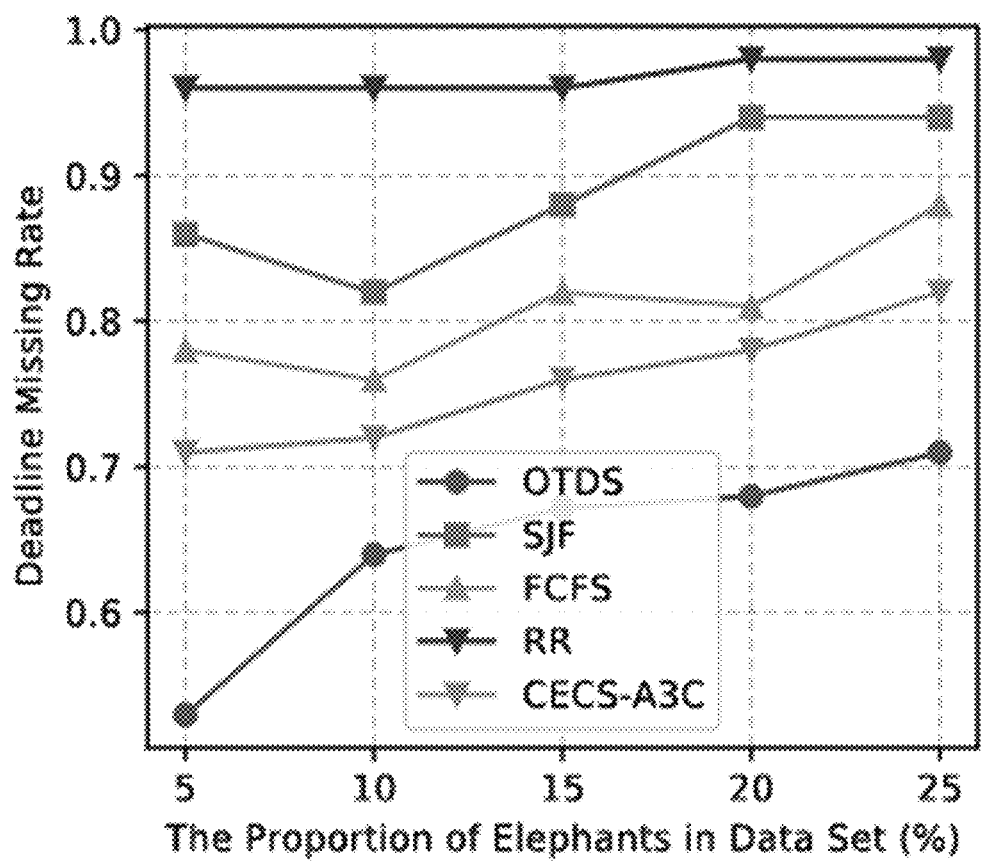

The considerations of fairness between different methods are compared as shown in FIGS. 10A-10B. The experimental data set consists of 500 tasks, and the performance of different algorithms is compared by adjusting the proportion of elephants in the data set. The tasks with the processing time of 1.0-1.5 seconds are defined as elephants and the tasks with the processing time of fewer than 0.5 seconds are defined as mice. The elephants and mice are uniformly distributed in the data set.

Since SJF deals with mice first, the average task response time of elephants is larger than other methods. RR doesn't take into account the different requirements for the time-sensitivity of different tasks and assigns the same computing resources to all tasks, which causes that the elephants need multiple rounds of computation to complete the calculation, so it has the worst performance. Since CECS-A3C doesn't consider fairness and only pursues efficiency, its performance on fairness is worse than OTDS. OTDS has a significant improvement over the RR method and other baseline methods. This is because OTDS can dynamically schedule tasks according to the state of the environment, so as to maximize the reward evaluated by the reward function. Therefore, OTDS can improve efficiency based on the fairness of the traditional RR method. With the increasing proportion of elephants, OTDS can allocate enough computing resources to elephants to prevent them from severe starvation.

Learning Process of the DRL-based Scheduler

Figure 11A:
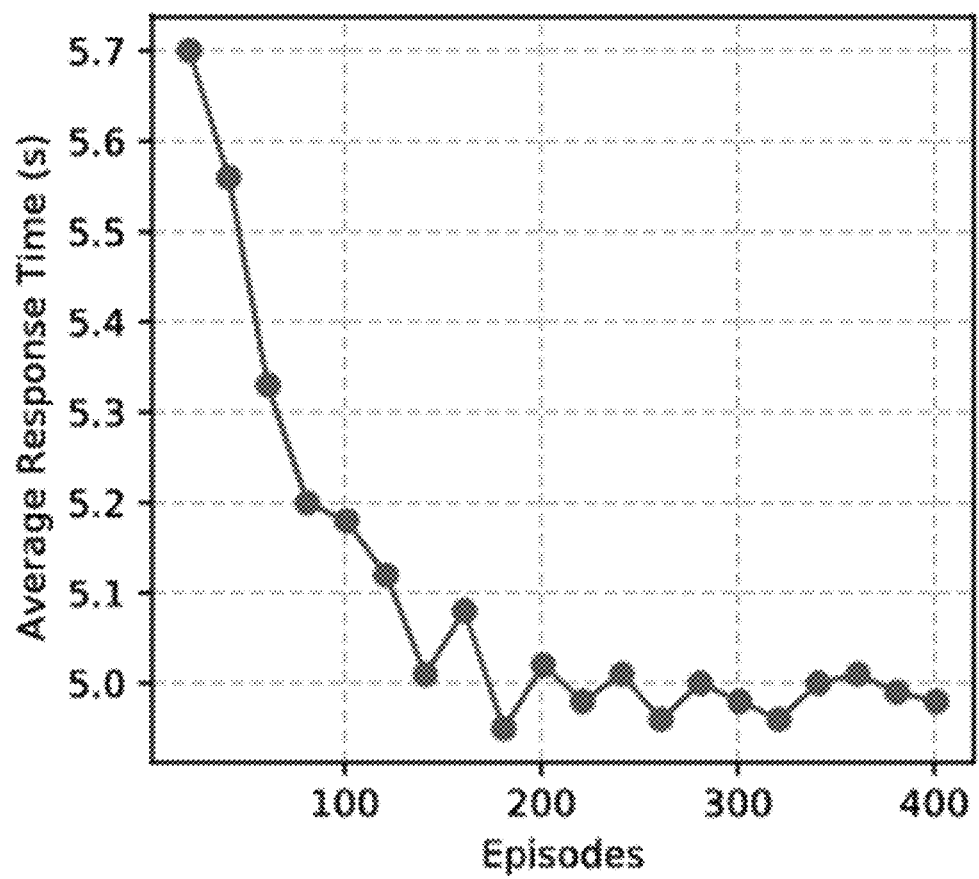
Figure 11B:
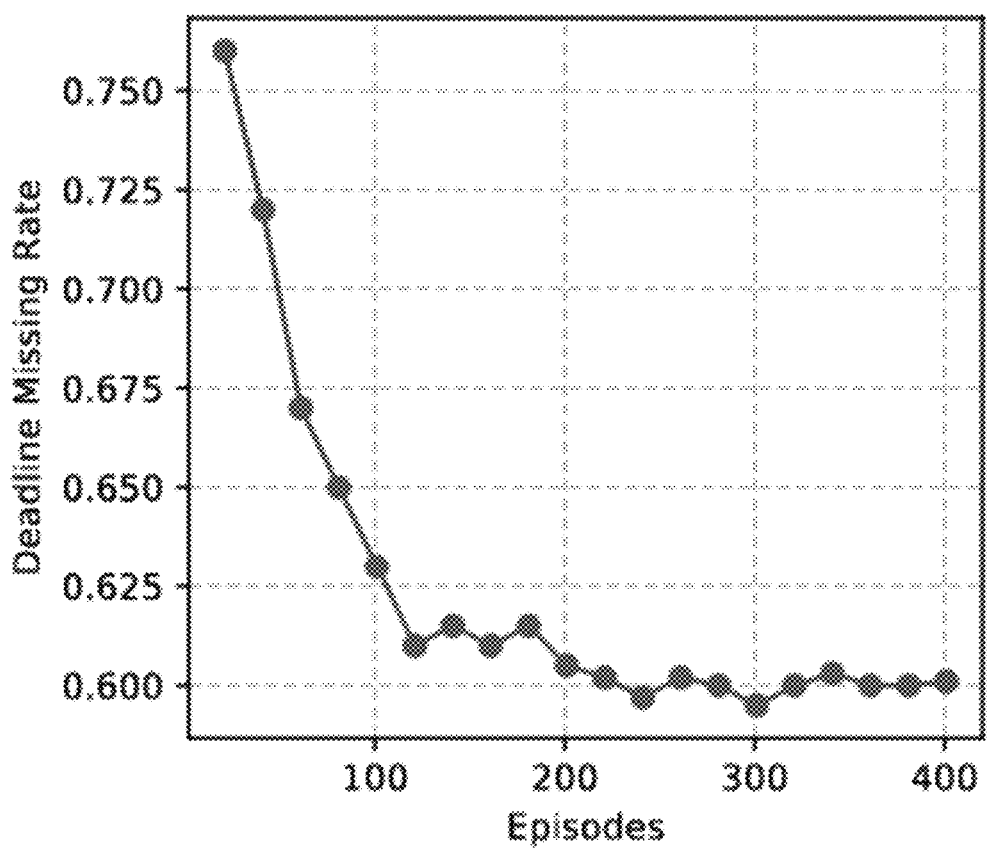

As shown in FIGS. 11A-11B, the learning process of the DRL-based scheduler is shown. The experiment is performed on the data group with a density of 7. The scheduler learns and iterates according to the reward evaluated by the reward function $R(s(t), a(t))$. The value for each point in the figure is the average value of twenty data around the selected point. At the beginning of the learning, the average task response time and the deadline missing rate of the task will drop rapidly. As the learning episodes increase, after about 400 episodes of learning within several minutes, the algorithm can converge to a relatively stable state, which is efficient.

Conclusion

The randomly offloaded tasks, time-varying network resources and limited computing resources cause the inefficient and unfair task dispatching and scheduling problem in the edge computing network. To solve this problem, OTDS, an online dispatching and fair scheduling method which combines with online learning and deep reinforcement learning techniques, is provided. OTDS can estimate the network conditions and server loads in real-time and reasonably allocate resources to the tasks according to their time-sensitive requirements, so as to ensure efficiency and fairness. Evaluation experiments were conducted on real-world data sets to assess the efficiency and fairness of different methods on the different numbers of tasks, different task arrival density, different number of edge servers, and fairness. Evaluation results show that the provided OTDS can make optimal actions through continuous learning from experience, thus performs well in efficiency and fairness in task dispatching and scheduling.

The emergence of edge computing can effectively tackle the problem of large transmission delays caused by the long-distance between user devices and remote cloud servers. Users can offload tasks to the nearby edge servers to perform computations, so as to minimize the average task response time through effective task dispatching and scheduling methods.

However, in the task dispatching phase, the dynamic features of network conditions and server loads make it difficult for the offloaded tasks to select the optimal edge server. Further, in the task scheduling phase, each edge server may face a large number of offloading tasks to schedule, resulting in long average task response time, or even severe task starvation.

In the present disclosure, OTDS may be used to aid in solving the above two challenges, which combines online learning and deep reinforcement learning techniques.

Specifically, using an online learning approach, OTDS performs real-time estimating of network conditions and server loads, and then dynamically assigns tasks to the optimal edge servers accordingly. Meanwhile, at each edge server, by combing the round-robin (RR) mechanism with deep reinforcement learning (DRL), OTDS is able to allocate appropriate resources to each task according to its time-sensitivity and achieve high efficiency and fairness in task scheduling. Evaluation results show that the online method of the present disclosure can dynamically allocate network resources and computing resources to those offloaded tasks according to their time-sensitive requirements. Thus, OTDS outperforms the existing methods in terms of the efficiency and fairness on task dispatching and scheduling by significantly reducing the average task response time.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the the-described embodiments, but instead is defined by the appended claims considering their full scope of equivalents.

What is claimed is:

1. An online task dispatching and scheduling system, comprising:
   an end device;
   an access point (AP) configured to receive a task from the end device;
   one or more edge servers configured to receive the task from the AP, the one or more edge servers comprising a task waiting queue, a processing pool, a task completion queue, and a scheduler,
   wherein the AP further comprises a dispatcher utilizing Online Learning (OL) for determining a real-time state of network conditions and server loads; and the AP selects a target edge server from the one or more edge servers to which the task is to be dispatched; and
   wherein the scheduler utilizes Deep Reinforcement Learning (DRL) in generating a task scheduling policy for the one or more edge servers.

2. The system of claim 1, wherein the dispatcher further comprises a Multi-Armed Bandit (MAB) framework, wherein the MAB framework comprises one or more arms corresponding to the one or more edge servers, a calculating reward device configured to calculate a reward, and a calculating regret device for calculating regret.

3. The system of claim 2, wherein the calculating reward device calculates the reward based on external delay and internal delay, and the MAB framework is configured to select a target arm from the one or more arms to maximize the reward.

4. The system of claim 3, wherein each of the one or more arms is associated with a weight, and the weight is updated after the task is completed according to a completion time of the task.

5. The system of claim 4, wherein the MAB framework further comprises an Oracle for selecting an optimal arm based on known network conditions and server loads, and the regret is calculated based on a difference between a reward of the target arm and a reward of the optimal arm.

6. The system of claim 5, wherein the target arm is selected using an Upper Confidence Bound (UCB) method.

7. The system of claim 1, wherein the scheduler further comprises a weighted, multi-queue Round Robin (RR) method and a deep Q-network (DQN) in generating the task scheduling policy.

8. The system of claim 7, wherein the weighted, multi-queue RR method further comprises a task waiting queue, a processing pool, and a task completion queue, and wherein the task completion queue is associated with the task.

9. The system of claim 8, wherein the task initially enters the task waiting queue upon arrival at the target edge server, and the task is transferred from the task waiting queue to the processing pool based on the task scheduling policy.

10. The system of claim 9, wherein the task comprises completed portions and incomplete portions; the completed portions are transferred to the task completion queue; and incomplete portions of the task are transferred to the task waiting queue.

11. The system of claim 7, wherein the task further has (1) a processing time corresponding to an amount of time the task is in the processing pool and (2) a waiting time corresponding to an amount of time the task is in the task waiting queue.

12. The system of claim 11, wherein the target edge server further comprises a state, the state based on the processing time and the waiting time.

13. The system of claim 12, wherein the scheduler is configured to assign the task a quantum based on the state.

14. The system of claim 13, wherein the scheduler is configured to create an action determining movement of the task from the task waiting queue to the processing pool.

15. The system of claim 14, wherein the scheduler is configured to calculate a reward function, the reward function based on the result of the action.

16. The system of claim 15, wherein the scheduler creates the action based on the reward function.

17. The system of claim 16, wherein the scheduler further comprises a replay buffer, a target neural network, a main neural network, and a loss function.

18. The system of claim 17, wherein the replay buffer is configured to store experiences of the scheduler interacting with the target edge node.

19. The system of claim 18, wherein the target neural network generates a target Q-value and the main neural network generates a current Q-value.

20. The system of claim 19, wherein the loss function is determined based on the difference between an expected value and a real value, and future actions created by the scheduler are based on the loss function.

* * * * *